United States Patent
Edell et al.

(10) Patent No.: US 10,321,167 B1
(45) Date of Patent: Jun. 11, 2019

(54) METHOD AND SYSTEM FOR DETERMINING MEDIA FILE IDENTIFIERS AND LIKELIHOOD OF MEDIA FILE RELATIONSHIPS

(71) Applicant: GrayMeta, Inc., Agoura Hills, CA (US)

(72) Inventors: Aaron Edell, Walnut Creek, CA (US); Sek Chai, Valencia, CA (US); Mat Ryer, London (GB)

(73) Assignee: GRAYMETA, INC., Agoura Hills, CA (US)

(*) Notice: Subject to any disclaimer, the term of this patent is extended or adjusted under 35 U.S.C. 154(b) by 97 days.

(21) Appl. No.: 15/413,365

(22) Filed: Jan. 23, 2017

Related U.S. Application Data

(60) Provisional application No. 62/281,711, filed on Jan. 21, 2016.

(51) Int. Cl.

| | |
|---|---|
| *H04N 7/16* | (2011.01) |
| *H04N 21/234* | (2011.01) |
| *H04N 21/254* | (2011.01) |
| *G06F 16/783* | (2019.01) |
| *G06F 16/901* | (2019.01) |
| *G06F 21/10* | (2013.01) |

(Continued)

(52) U.S. Cl.
CPC ..... *H04N 21/23418* (2013.01); *G06F 16/783* (2019.01); *G06F 16/901* (2019.01); *G06F 21/10* (2013.01); *H04L 63/30* (2013.01); *H04N 21/2541* (2013.01); *H04N 21/2743* (2013.01)

(58) Field of Classification Search
CPC ......... H04N 21/2541; H04N 21/23418; H04N 21/2743; G06F 17/30784; G06F 17/30946; G06F 21/10; H04L 63/30
See application file for complete search history.

(56) References Cited

U.S. PATENT DOCUMENTS

| | | |
|---|---|---|
| 5,873,085 A | 2/1999 | Enoki et al. |
| 5,897,638 A | 4/1999 | Lasser et al. |
| 6,356,863 B1 | 3/2002 | Sayle |

(Continued)

FOREIGN PATENT DOCUMENTS

| | | |
|---|---|---|
| EP | 0774723 A2 | 5/1997 |
| EP | 0840242 A2 | 5/1998 |

(Continued)

OTHER PUBLICATIONS

Bronstein, et al. The Video Genome. BBK Technologies Ltd. Submitted Mar. 27, 2010. Published Mar. 30, 2010. arXiv:1003.5320v1. 18 pages.

(Continued)

*Primary Examiner* — Nasser M Goodarzi
*Assistant Examiner* — Patrick A Ryan
(74) *Attorney, Agent, or Firm* — Wilson Sonsini Goodrich & Rosati

(57) ABSTRACT

A method and system for determining the likelihood or similarity ratio that a selected media file of interest is related to one or more predetermined media files is provided that utilizes, combines, analyzes, and evaluates different categories of data and metadata extracted from each media file to generate a media file identifier for each media file that can then be used as a basis to compare any two media files to each other.

20 Claims, 11 Drawing Sheets

(51) Int. Cl.
*H04L 29/06* (2006.01)
*H04N 21/2743* (2011.01)

(56) References Cited

U.S. PATENT DOCUMENTS

| | | |
|---|---|---|
| 6,356,915 B1 | 3/2002 | Chtchetkine et al. |
| 6,381,615 B2 | 4/2002 | Gaither et al. |
| 6,895,591 B1 | 5/2005 | Russ et al. |
| 7,024,427 B2 | 4/2006 | Bobbitt et al. |
| 7,200,622 B2 | 4/2007 | Nakatani et al. |
| 7,296,041 B2 | 11/2007 | Nakatani et al. |
| 7,496,613 B2 | 2/2009 | Raghunath et al. |
| 7,644,136 B2 | 1/2010 | Rose et al. |
| 7,756,821 B2 | 7/2010 | Havens et al. |
| 7,831,578 B2 | 11/2010 | Chuang et al. |
| 7,908,476 B2 | 3/2011 | Kandasamy et al. |
| 8,001,086 B2 | 8/2011 | Raghunath et all |
| 8,065,730 B1 | 11/2011 | Sobel et al. |
| 8,103,050 B2 | 1/2012 | Lefebvre et al. |
| 8,104,083 B1 | 1/2012 | Sobel et al. |
| 8,205,193 B2 | 6/2012 | Hertling et al. |
| 8,285,118 B2 | 10/2012 | Bronstein et al. |
| 8,358,840 B2 | 1/2013 | Bronstein et al. |
| 8,417,037 B2 | 4/2013 | Bronstein et al. |
| 8,434,016 B2 | 4/2013 | Butlin et al. |
| 8,442,384 B2 | 5/2013 | Bronstein et al. |
| 8,549,556 B2 | 10/2013 | Rakib et al. |
| 8,594,429 B2 | 11/2013 | Delorme et al. |
| 8,627,269 B2 | 1/2014 | Malasky et al. |
| 8,655,826 B1 * | 2/2014 | Drewry ............... G06F 21/10 706/48 |
| 8,676,030 B2 | 3/2014 | Rakib et al. |
| 8,719,288 B2 | 5/2014 | Bronstein et al. |
| 8,731,235 B2 | 5/2014 | Boyd et al. |
| 8,732,220 B2 | 5/2014 | Do et al. |
| 8,793,274 B2 | 7/2014 | Yu et al. |
| 8,839,245 B1 | 9/2014 | Khajuria et al. |
| 8,863,297 B2 | 10/2014 | Sharma et al. |
| 8,863,298 B2 | 10/2014 | Akella et al. |
| 8,863,299 B2 | 10/2014 | Sharma et al. |
| 8,892,572 B2 | 11/2014 | Sanjeev |
| 8,990,270 B2 | 3/2015 | Uysal et al. |
| 9,100,245 B1 | 8/2015 | Andrews et al. |
| 9,122,706 B1 | 9/2015 | Holzschneider et al. |
| 9,135,270 B2 | 9/2015 | Goddard et al. |
| 9,213,858 B2 | 12/2015 | Sharma et al. |
| 9,311,375 B1 | 4/2016 | Naik |
| 9,401,972 B2 | 7/2016 | Yu et al. |
| 9,465,953 B2 | 10/2016 | Sharma et al. |
| 9,524,122 B2 | 12/2016 | Wade et al. |
| 2002/0112012 A1 | 8/2002 | Jones et al. |
| 2002/0188935 A1 | 12/2002 | Hertling et al. |
| 2003/0110188 A1 | 6/2003 | Howard et al. |
| 2003/0115218 A1 | 6/2003 | Bobbitt et al. |
| 2005/0114350 A1 | 5/2005 | Rose et al. |
| 2005/0210074 A1 | 9/2005 | Nakatani et al. |
| 2005/0273486 A1 | 12/2005 | Keith |
| 2006/0041527 A1 | 2/2006 | Fessler |
| 2006/0123062 A1 | 6/2006 | Bobbitt et al. |
| 2006/0173805 A1 | 8/2006 | Clifford et al. |
| 2006/0288034 A1 | 12/2006 | Do et al. |
| 2007/0162510 A1 | 7/2007 | Lenzmeier et al. |
| 2007/0283280 A1 | 12/2007 | Butlin et al. |
| 2008/0126434 A1 | 5/2008 | Uysal et al. |
| 2008/0155214 A1 | 6/2008 | Shitomi |
| 2008/0165957 A1 | 7/2008 | Kandasamy et al. |
| 2008/0216009 A1 | 9/2008 | Drallos |
| 2009/0022472 A1 | 1/2009 | Bronstein et al. |
| 2009/0150879 A1 | 6/2009 | Raghunath et al. |
| 2009/0175538 A1 | 7/2009 | Bronstein et al. |
| 2009/0259633 A1 | 10/2009 | Bronstein et al. |
| 2010/0005488 A1 | 1/2010 | Rakib et al. |
| 2010/0008643 A1 | 1/2010 | Rakib et al. |
| 2010/0011392 A1 | 1/2010 | Bronstein et al. |
| 2010/0085481 A1 | 4/2010 | Winter et al. |
| 2010/0104184 A1 | 4/2010 | Bronstein et al. |
| 2010/0287201 A1 * | 11/2010 | Damstra ........... G06F 17/30781 707/780 |
| 2011/0035358 A1 | 2/2011 | Naik |
| 2011/0040812 A1 | 2/2011 | Phillips |
| 2011/0246471 A1 | 10/2011 | Rakib |
| 2011/0289114 A1 | 11/2011 | Yu et al. |
| 2011/0289532 A1 | 11/2011 | Yu et al. |
| 2011/0296452 A1 | 12/2011 | Yu et al. |
| 2012/0124638 A1 * | 5/2012 | King ..................... G06Q 10/101 726/1 |
| 2012/0143929 A1 | 6/2012 | Baratakke et al. |
| 2013/0006951 A1 | 1/2013 | Yu et al. |
| 2013/0013583 A1 | 1/2013 | Yu et al. |
| 2013/0167104 A1 | 6/2013 | Malasky et al. |
| 2013/0219176 A1 | 8/2013 | Akella et al. |
| 2013/0219456 A1 | 8/2013 | Sharma et al. |
| 2013/0247036 A1 | 9/2013 | Fujiwara |
| 2013/0297662 A1 | 11/2013 | Sharma et al. |
| 2014/0082051 A1 | 3/2014 | Yu et al. |
| 2014/0136578 A1 | 5/2014 | Wood et al. |
| 2014/0140682 A1 * | 5/2014 | Wang ............... G11B 20/00884 386/260 |
| 2014/0250450 A1 | 9/2014 | Yu et al. |
| 2014/0324845 A1 | 10/2014 | Bronstein et al. |
| 2015/0046537 A1 | 2/2015 | Rakib |
| 2015/0058998 A1 | 2/2015 | Yu et al. |
| 2015/0095972 A1 | 4/2015 | Sharma et al. |
| 2015/0235047 A1 | 8/2015 | Lenzmeier et al. |
| 2015/0237410 A1 | 8/2015 | Yu et al. |
| 2015/0254342 A1 | 9/2015 | Yu et al. |
| 2015/0254343 A1 | 9/2015 | Yu et al. |
| 2015/0302886 A1 * | 10/2015 | Brock ................. G06F 21/10 726/32 |
| 2015/0379039 A1 | 12/2015 | Chandrasekaran et al. |
| 2015/0381671 A1 | 12/2015 | Lee et al. |
| 2016/0063272 A1 | 3/2016 | Sharma et al. |
| 2016/0246816 A1 | 8/2016 | Abiri et al. |
| 2016/0275101 A1 | 9/2016 | Hinterbichler et al. |
| 2016/0292080 A1 | 10/2016 | Leidel et al. |
| 2017/0004131 A1 | 1/2017 | Ben Dayan et al. |

FOREIGN PATENT DOCUMENTS

| | | |
|---|---|---|
| EP | 0774723 A3 | 7/1998 |
| EP | 0840242 A3 | 3/2002 |
| EP | 1267259 A2 | 12/2002 |
| EP | 1267259 A3 | 5/2004 |
| JP | H02257340 A | 10/1990 |
| JP | H05216938 A | 8/1993 |
| JP | H0749805 A | 2/1995 |
| JP | H103421 A | 1/1998 |
| JP | 2000513857 A | 10/2000 |
| JP | 2001051890 A | 2/2001 |
| JP | 2002524793 A | 8/2002 |
| JP | 2004288129 A | 10/2004 |
| JP | 2007513429 A | 5/2007 |
| JP | 2007535025 A | 11/2007 |
| JP | 2008547074 A | 12/2008 |
| JP | 2009053995 A | 3/2009 |
| JP | 2012168906 A | 9/2012 |
| JP | 2014174870 A | 9/2014 |
| WO | WO-9858331 A1 | 12/1998 |
| WO | WO-0014632 A1 | 3/2000 |
| WO | WO-2005057343 A2 | 6/2005 |
| WO | WO-2005081132 A1 | 9/2005 |
| WO | WO-2005119495 A2 | 12/2005 |
| WO | WO-2006134023 A1 | 12/2006 |
| WO | WO-2009035764 A2 | 3/2009 |
| WO | WO-2005119495 A3 | 4/2009 |
| WO | WO-2009035764 A3 | 8/2009 |
| WO | WO-2009129243 A1 | 10/2009 |
| WO | WO-2009129328 A1 | 10/2009 |
| WO | WO-2009146180 A2 | 12/2009 |
| WO | WO-2011022388 A1 | 2/2011 |
| WO | WO-2014078445 A1 | 5/2014 |

(56) References Cited

FOREIGN PATENT DOCUMENTS

| WO | WO-2016018446 A1 | 2/2016 |
| WO | WO-2016161251 A1 | 10/2016 |

OTHER PUBLICATIONS

Co-pending U.S. Appl. No. 15/469,375, filed Mar. 24, 2017.
Co-pending U.S. Appl. No. 15/831,133, filed Dec. 4, 2017.

* cited by examiner

US 10,321,167 B1

METHOD AND SYSTEM FOR DETERMINING MEDIA FILE IDENTIFIERS AND LIKELIHOOD OF MEDIA FILE RELATIONSHIPS

The present application is a non-provisional of, and claims the benefit of U.S. Provisional Patent Application 62/281,711, filed on Jan. 21, 2016, the entire contents of which are incorporated herein by reference.

BACKGROUND OF THE INVENTION

The present application relates to a method and system for determining media file identifiers and for determining the likelihood that a media file is related to, a derivative work of, or derived from one or more other media files that are not necessarily of the same type. More specifically, the present application relates to a method and system of extracting different types or categories of data or metadata from media files, analyzing or evaluating the different types or categories of extracted data and metadata to determine media file identifiers, and comparing the media file identifiers to determine a similarity ratio that captures the similarity between two media files that are not necessarily of the same type.

DESCRIPTION OF BACKGROUND ART

Digital content describes any file or set of data present on any digital system. Digital content may be any of a variety of digital media, including but not limited to voice (i.e. speech), music, video, audio, two-dimensional still images, two-dimensional moving images, including film and video, and text in various formats, including documents, subtitles, scripts, and the like.

The proliferation of digital media coupled with the ease of duplicating digital media files and of converting analog to digital media files has created growing concerns for copyright-owning individuals and organizations seeking to protect their copyrighted original works from unauthorized use or distribution. These concerns have spurred the development and use of digital rights management (DRM) schemes for controlling access and restricting usage of proprietary and copyrighted works including for example software and multimedia content.

Identifying exact duplicates of a work where the original and the copy are the same type of media file, for example—two video files—is generally a straightforward comparison of apples to apples. The challenge arises when digital content has been copied from one type of media file to a different type of media file. For example, an image in a video file might be copied to a digital photo in a JPEG format, or to a document in a PDF file format. An individual or organization that owns the copyright to the video file might want to know whether such an image has been copied to other media file formats. But due to the vast and increasing variety of different types of digital media, each having their own different types or categories of data and metadata, determining what or how much digital content of an original work has been copied to another digital media file poses a real technical challenge. What is needed is a method and system that can help to provide protection for owners of copyrighted original works from unauthorized use or distribution due to the copying of digital content from one type of media file to a different type of media file.

Accordingly, it would be advantageous to provide a method and system that can compare apples to oranges—namely, digital media that are not the same type and that may have different types or categories of data or metadata but where protected digital content has been copied from one media file to the other. But to compare apples to oranges in this case necessitates a method and system that can extract meaningful information from different types or categories of data or metadata taken from different types of media files in a form normalized to enable a meaningful comparison. The extraction of the different types or categories of data or metadata and the conversion of such data into a normalized form is a critical piece to addressing this problem. To accomplish this requires an understanding of how to evaluate the various data and metadata.

Simply put, metadata is data about data. For example, metadata may describe details about a file or a data stream. Metadata may include certain information about a set of data, such as the data format, where the data came from, when it was created or last edited, who created the data, and who has accessed the data.

Metadata may be generated by various means, for example, by taking an original data set and extrapolating certain information from it or interpreting it to generate new information. Metadata may be generated as a result of various processes including face detection, speech-to-text creation, object recognition, and other processes that result in generating details about data, which may comprise video or a still image data file.

Various algorithms may be used for extracting and generating metadata from data sources. Some of these algorithms may be found in the public domain and may be available on the Internet on websites from various universities, commercial entities, and from individuals through personal websites, while other algorithms or tools are proprietary. Representative examples of algorithms relating to moving image files, such as film and video, include: a) speech-to-text algorithms; b) optical character recognition (OCR) or text recognition algorithms; c) face detection algorithms; d) object recognition algorithms; e) picture, frame, and audio similarity algorithms.

There are a variety of known standards for metadata as it relates to different data sources. In particular, metadata may be embedded with the data source or file and may provide various types of information, including for example: a) the frame size; b) the length or duration of data content; c) the format of data content; e) the name of the data source; and f) information related to the context of the data source (e.g. permissions).

There are also various systems that extract metadata from data sources and store the metadata in a data store. In a software environment where media files are harvested for embedded data and metadata, and that data and/or metadata is collected and stored for various uses and presentations, individual extraction engines making use of both proprietary and open-sourced or licensed extraction libraries and/or algorithms may be used to extract different types or categories of data and metadata from the same data source or from different types of media files. It would therefore be desirable to have a method and system that can utilize, combine, analyze, and evaluate these different types or categories of data and metadata in order to transform the data into a normalized form such as a characteristic identifier, to provide a basis for a meaningful comparison between different types of media files. A characteristic identifier basically acts to transform an orange into an apple for purposes of comparison. Thus, while the original media files may not be directly compared to provide a meaningful similarity metric, their characteristic identifiers can be compared to each other to provide a similarity ratio that quantifies the similarity between the two different types of media files.

The challenge posed here how to determine whether a media file is a derivative work or is derived from another media file, where the two files being compared are not necessarily of the same file format type. What is needed to address this challenge is a method and system that can not only compare different media file types to determine whether a media file of interest contains digital content copied from an original work but that can also provide a tangible measure of similarity to quantify how much the media file of interest is considered to resemble, be a derivative work of, or be derived from an original work. At least some of these advantages and benefits are addressed by the system and method disclosed herein.

SUMMARY OF THE INVENTION

Disclosed herein is a method and system for extracting different types, categories, sets, or subsets of data and metadata from a given data set or media file and utilizing the different types, categories, sets, or subsets of data and metadata to determine how closely a given data set or media file is related to or is derived from another data set or media file, wherein the media files are not necessarily the same type. By extracting and utilizing different types, categories, sets, or subsets of data and metadata from a given data set or media file, the method and system as disclosed herein provides a way of comparing different types of media files to determine whether one is, for example, a derivative work of or derived from another. In this way, the method and system disclosed herein can provide a tangible metric in the form of a similarity ratio that quantifies the similarity between disparate types of files.

In a first aspect, a system for determining a similarity ratio that a selected media file of interest is a derivative work of or is derived from one or more predetermined media files comprises a data receiving and input device for receiving a selected media file of interest and one or more predetermined media files to be compared with the selected media file of interest and a data receiving and output device for providing similarity ratios quantifying how similar a selected media file of interest is to each of the one or more predetermined media files. The system also comprises a data and metadata harvesting, extraction, analysis, evaluation, and storage system. The data and metadata harvesting, extraction, analysis, evaluation, and storage system can comprise at least two data extraction engines configured to extract different categories of data or metadata from the selected media file of interest and from each of the one or more predetermined media files and a data and metadata harvesting engine configured to manage the at least two data extraction engines and to collect and harvest data or metadata extracted from the at least two data extraction engines. The harvested data or metadata can be stored in a data store as data or metadata subsets within each category of data or metadata extracted from the selected media file of interest and each of the one or more predetermined media files. The data and metadata harvesting, extraction, analysis, evaluation, and storage system can further comprise an analysis engine configured to combine and evaluate two or more ranked subsets of data or metadata; generate media file identifiers for the selected media file of interest and for each of the one or more predetermined media files; compare the generated media file identifier for the selected media file of interest with each of the generated media file identifiers for each of the one or more predetermined media files; and determine similarity ratios that a selected media file of interest is a derivative work of or is derived from one or more predetermined media files based on the comparison of the media file identifier for the selected media file of interest with each of the generated media file identifiers for each of the one or more predetermined media files. Finally, the system can comprise a user interface configured to provide a user access to a set of features and functionality of the system and to enable the user to select and rank one or more harvested subsets of data or metadata.

In addition, the system as disclosed herein can comprise a data store configured to store: the data and metadata extracted from the selected media file of interest and each of the one or more predetermined media files; the media file identifiers generated for the selected media file of interest and each of the one or more predetermined media files; and the similarity ratios determined for each comparison made between the media file identifier of the selected media file of interest and the media file identifiers of each of the one or more predetermined media files. The data store can be configured to store media file identifiers that have been generated for each of the one or more predetermined media files to form a library of media file identifiers for a set of predetermined media files prior to receiving a selected media file of interest. In some embodiments, the one or more harvested subsets of data or metadata can be ranked according to their importance by the user. Each ranking can be used to assign a weight to the one or more harvested subsets of data or metadata. The weight assigned to the one or more harvested subsets of data or metadata can be used in generating media file identifiers for the selected media file of interest and for each of the one or more predetermined media files.

In some embodiments, at least two data extraction engines can be configured to use the same data extraction process to extract different categories of data or metadata from the selected media file of interest and from each of the one or more predetermined media files. As another example, the selected media file of interest can be selected by an automated selection system. Additionally, the data and metadata harvesting engine can comprise an extraction engine manager configured to engage a first extraction engine and one or more other extraction engines in parallel or in sequence. The similarity ratios can be determined as a percentage. In a preferable embodiment, at least one of the one or more predetermined media files is not the same type of media file as the selected media file of interest.

In another aspect, a method for determining a similarity ratio that a selected media file of interest is a derivative work of or is derived from one or more predetermined media files comprises providing a selected media file of interest and one or more predetermined media files to be compared with the selected media file of interest and extracting data or metadata from the selected media file of interest and the one or more predetermined files. At least two different categories of data or metadata can be extracted from the selected media file of interest and the one or more predetermined media files by engaging at least two extraction engines. The method further comprises harvesting the data or metadata extracted from the selected media file of interest and the one or more predetermined media files, storing the data or metadata extracted from the selected media file of interest and the one or more predetermined media files, selecting two or more ranked categories for the data or metadata extracted from the selected media file of interest and for each of the one or more predetermined media files, generating a media file identifier for the selected media file of interest and for each of the one or more predetermined media files based on the two or more ranked categories for the data or metadata extracted from the selected media file of interest and the one or more predetermined media files, storing the media file identifier generated for the selected media file of interest and the media file identifiers generated for each of the one or more predetermined media files, comparing the media file identifier generated for the selected media file of interest to the media file identifier generated for each of the one or more predetermined media files, and determining a similarity ratio that the selected media file of interest is a derivative work of or is derived from each of the one or more predetermined media files based on comparing the media file identifier generated for the selected media file of interest to the media file identifiers generated for each of the one or more predetermined media files.

In some embodiments, the method disclosed herein can comprise storing media file identifiers that have been generated for each of the one or more predetermined media files to form a library of media file identifiers and retrieving the stored media file identifiers that have been generated for each of the one or more predetermined media files from the library of media file identifiers to compare the media file identifier generated for the selected media file of interest to the media file identifier generated for each of the one or more predetermined media files. In addition, the method can comprise assigning a weight to the one or more harvested subsets of data or metadata, wherein the weight assigned to the one or more harvested subsets of data or metadata is based on the ranking of the categories for the data or metadata. The assigned weight can be used to generate the media file identifiers for the selected media file of interest and for each of the one or more predetermined media files. In other examples, at least two data extraction engines can be configured to use the same data extraction process to extract different categories of data or metadata from the selected media file of interest and from each of the one or more predetermined media files. Moreover, the similarity ratios can be determined as a percentage. In a preferable embodiment, at least one of the one or more predetermined media files is not the same type of media file as the selected media file of interest.

In still another aspect, non-transitory computer-readable storage media encoded with a computer program including instructions executable by a processor for determining a similarity ratio that a selected media file of interest is a derivative work or is derived from one or more predetermined media files comprises: a database, recorded on the media, comprising different types of data and metadata extracted from each of the selected media file of interest and the one or more predetermined media files and an evaluation software module.

The evaluation software module can comprise instructions for: extracting data or metadata from the selected media file of interest and the one or more predetermined files, wherein at least two different categories of data or metadata are extracted from the selected media file of interest and the one or more predetermined media files by engaging at least two extraction engines, harvesting the data or metadata extracted from the selected media file of interest and the one or more predetermined media files, storing the data or metadata extracted from the selected media file of interest and the one or more predetermined media files, selecting two or more ranked categories for the data or metadata extracted from the selected media file of interest and the one or more predetermined media files, generating a media file identifier for the selected media file of interest and for each of the one or more predetermined media files based on the two or more ranked categories for the data or metadata extracted from the selected media file of interest and the one or more predetermined media files, storing the media file identifiers generated for the selected media file of interest and for each of the one or more predetermined media files, comparing the media file identifier generated for the selected media file of interest to each of the media file identifier generated for each of the one or more predetermined media files, and determining a similarity ratio that the selected media file of interest is a derivative work of or is derived from each of the one or more predetermined media files based on comparing the media file identifier generated for the selected media file of interest to each of the media file identifiers generated for each of the one or more predetermined media files.

In some embodiments, the evaluation software module can comprise instructions for: storing the data or metadata extracted from the selected media file of interest and the one or more predetermined media files in the database; storing the media file identifiers generated for the selected media file of interest and for each of the one or more predetermined media files in the database; and storing the similarity ratio in the database. In some examples, the one or more harvested subsets of data or metadata can be ranked according to their importance. Each ranking can be used to assign a weight to the one or more harvested subsets of data or metadata. Additionally, the weight assigned to the one or more harvested subsets of data or metadata can be used in generating media file identifiers for the selected media file of interest and for each of the one or more predetermined media files. In a preferable embodiment, at least one of the one or more predetermined media files is not the same type of media file as the selected media file of interest.

These and other embodiments are described in further detail in the following description related to the appended drawing figures.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
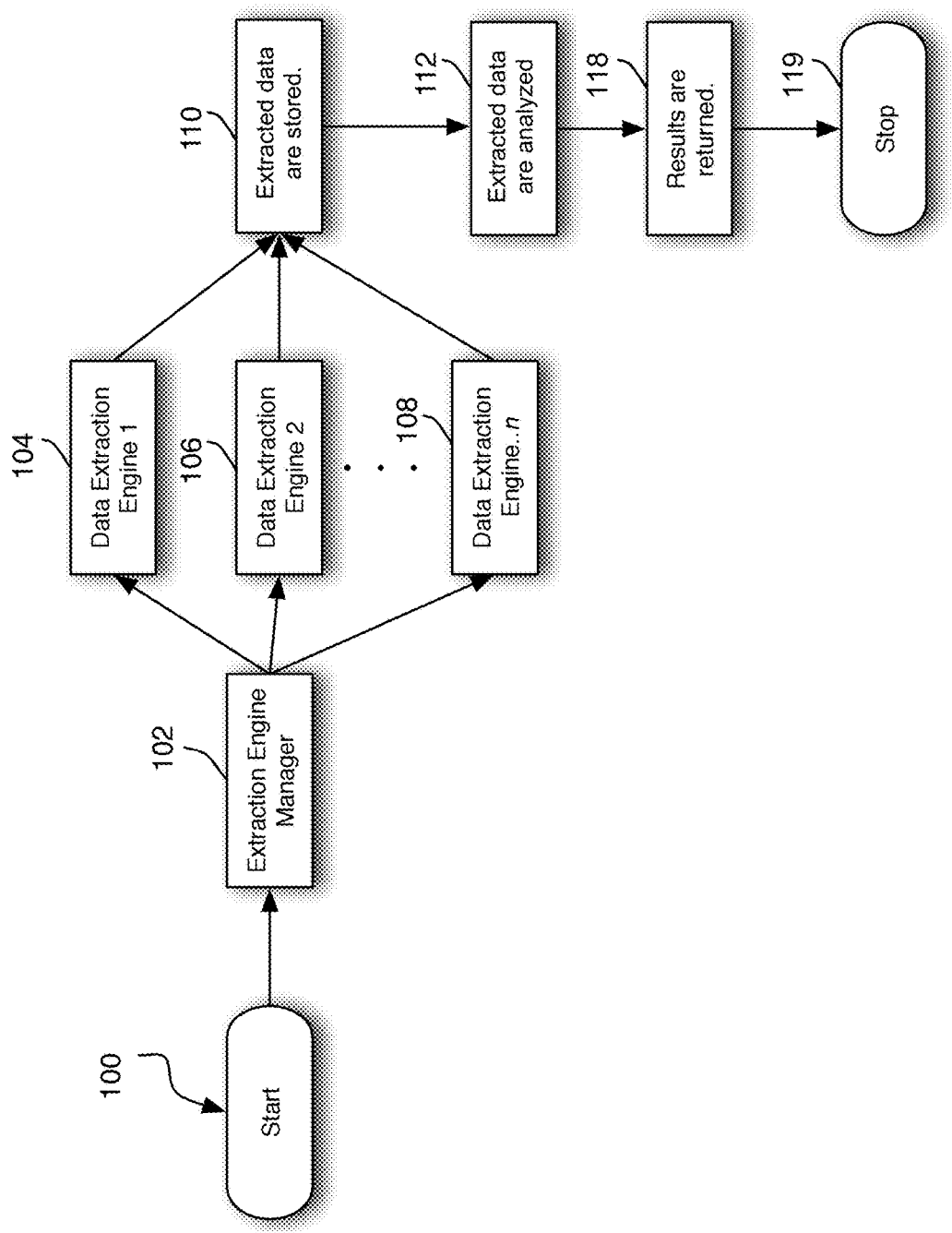
FIG. 1 is a flowchart showing a number of steps in an exemplary method as disclosed herein.

Specific embodiments of the disclosed method and system will now be described with reference to the drawings. Nothing in this detailed description is intended to imply that any particular step, component, or feature is essential to the method and system as disclosed herein.

For clarity of presentation, the disclosed method, system, and underlying metadata extraction are exemplified and described with focus on the analysis of a two-dimensional digital source or "document," although the disclosed method and system are not limited to such documents and may be applied to other sources of data. A document may be obtained from an image acquisition device such as a video camera or it may be read into memory from a data storage device, for example, in the form of a media file.

In a first aspect, a method for determining the similarity ratio that a selected media file of interest is a derivative work or is derived from one or more predetermined media files comprises: providing a selected media file of interest and one or more predetermined media files to be compared with the selected media file of interest; extracting data or metadata from the selected media file of interest and the one or more predetermined files, wherein at least two different categories of data or metadata are extracted from the selected media file of interest and the one or more predetermined media files by engaging at least two extraction engines; harvesting the data or metadata extracted from the selected media file of interest and the one or more predetermined media files; storing the data or metadata extracted from the selected media file of interest and the one or more predetermined media files; selecting two or more ranked categories for the data or metadata extracted from the selected media file of interest and the one or more predetermined media files; generating a media file identifier for each of the selected media file of interest and the one or more predetermined media files; storing the media file identifier generated from each of the selected media file of interest and the one or more predetermined media files; comparing the media file identifier generated from the selected media file of interest to the media file identifier generated from each of the one or more predetermined media files; and determining a similarity ratio that the selected media file of interest is a derivative work of or is derived from each of the one or more predetermined media files based on comparing the media file identifier generated from the selected media file of interest to the media file identifier generated from each of the one or more predetermined media files.

In another aspect, a VideoDNA™ system for determining the likelihood or similarity ratio that a selected media file of interest is related to one or more predetermined media files comprises: a data receiving and input device for receiving a selected media file of interest and one or more predetermined media files to be compared with the selected media file of interest; a data receiving and output device for providing likelihood values or similarity ratios representing the likelihood that the selected media file of interest is related to each of the one or more predetermined media files; and a data and metadata harvesting, extraction, analysis, evaluation, and storage system, the data and metadata harvesting, extraction, analysis, evaluation, and storage system further comprising: at least two data extraction engines configured to extract different categories of data or metadata from the selected media file of interest and each of the one or more predetermined media files; a data and metadata harvesting engine configured to manage the at least two data extraction engines and to collect and harvest data or metadata extracted from the at least two data extraction engines, wherein the harvested data or metadata is stored in a data store as data or metadata subsets within each category of data or metadata extracted from the selected media file of interest and each of the one or more predetermined media files; a user interface configured to provide a user access to a set of features and functionality of the VideoDNA™ system and to enable the user to select and rank one or more harvested subsets of data or metadata; a VideoDNA™ Analysis Engine configured to combine, analyze and/or evaluate two or more ranked subsets of data or metadata in order to generate media file identifiers for the selected media file of interest and each of the one or more predetermined media files and to determine likelihood values or similarity ratios representing similarity between the selected media file of interest and each of the one or more predetermined media files; and a data store configured to store: the data and metadata extracted and/or harvested from the selected media file of interest and each of the one or more predetermined media files; the media file identifiers generated for the selected media file of interest and each of the one or more predetermined media files; and the likelihood values or similarity ratios determined for each comparison made between the selected media file of interest and each of the one or more predetermined media files.

FIG. 1 is a flowchart showing a number of steps in an exemplary method as disclosed herein. The process starts at 100 where a media file can be provided, which can trigger an extraction engine manager 102 to programmatically engage at least a first extraction engine at 104 and a second extraction engine at 106. In one embodiment, at least two different categories of data or metadata can be extracted through 104 and 106 respectively. The data or metadata extracted from the at least two extraction engines can be stored at 110. The different categories, sets, or subsets of data or metadata can be combined, analyzed and/or evaluated at 112 to generate a media file identifier for the media file. The media file identifier can then be stored by the system. This process, beginning with the presentation of media files at 100 and ending with the storing of media file identifiers may be repeated for any number of media files to form a library of media file identifiers for a set of predetermined media files that may later be used as a basis of comparison with respect to a selected media file of interest. In particular, once a media file identifier has been generated for a selected media file of interest, it may be compared against each media file identifier previously stored by the system at 112 where a likelihood value or similarity ratio for each comparison may be generated. The likelihood value or similarity ratio representing the similarity between the selected media file of interest and a predetermined media file previously analyzed or evaluated by the system is returned at 118. Step 119 describes the end of this process.

Figure 2:
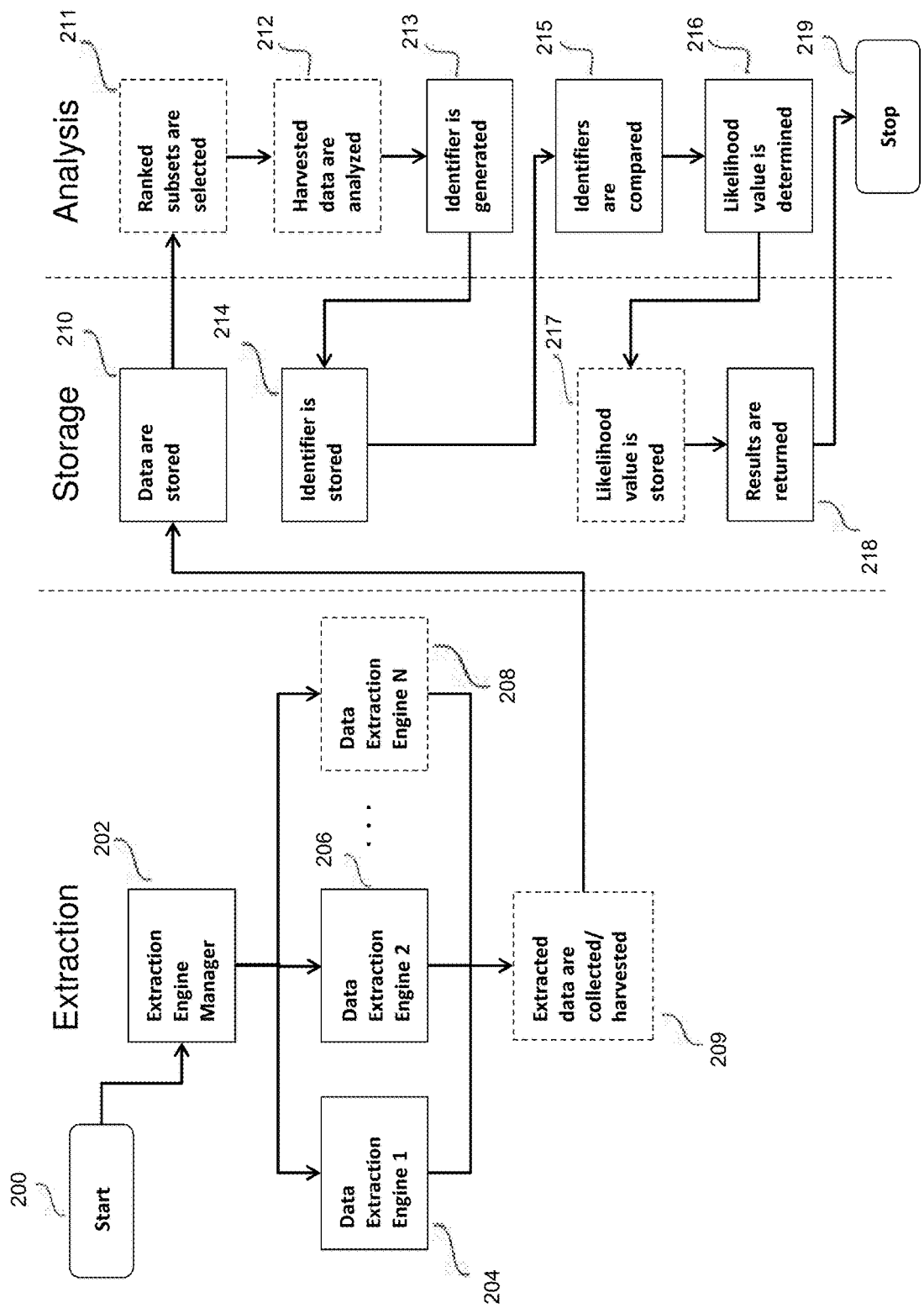
FIG. 2 is a flowchart showing another exemplary method as disclosed herein.

FIG. 2 is a flowchart showing another exemplary method as disclosed herein. The process starts at 200 where a selected media file of interest can be provided, which can trigger an extraction engine manager 202 to programmatically engage at least a first extraction engine at 204 and a second extraction engine at 206. In one embodiment of the invention, at least two different categories of data or metadata can be extracted through 204 and 206 respectively. The data or metadata extracted from the at least two extraction engines can be collected and harvested at 209 and stored at 210. A media file identifier for any given file can comprise the data or metadata extracted from that file by the extraction engines.

In some embodiments, two or more ranked types, categories, sets, or subsets of data or metadata can be selected at 211 and the different categories, sets, or subsets of data or metadata can be combined and analyzed or evaluated at 212 to generate a media file identifier for the media file at 213, which can then be stored at 214. This process, beginning with the presentation of media files at 200 and ending with the storing of media file identifiers at 214 may be repeated for any number of media files to form a library of media file identifiers at 214 for a set of predetermined media files that may later be used as a basis of comparison with respect to a selected media file of interest.

Once a library of media file identifiers for a set of predetermined media files has been established, a selected media file of interest can be provided at 200 and the selected media file of interest can be processed according to the flowchart in FIG. 2 until a media file identifier associated with the selected media file of interest is generated at 213 and stored at 214. The media file identifier of the selected media file of interest can then be compared at 215 with the media file identifiers of the predetermined media files stored in the media file identifier library. Through a comparison of their respective media file identifiers, a determination can be made at 216 as to how closely the selected media file of interest is related to, a derivative work of, or is otherwise similar to each of the predetermined media files stored in the library. The likelihood or similarity ratios or values generated as a result of comparing the media file identifiers of the selected media file of interest with each predetermined media file can be stored at 217 and returned at 218. Step 219 describes the end of this process.

The selection of a media file of interest may be performed by a user or by an automated selection system. In addition, after the extraction engine manager 202 has programmatically engaged at least a first extraction engine at 204 and a second extraction engine at 206, it may thereafter, engage any number of additional extraction engines at 208 in parallel or in sequence. Alternatively, the extraction engine manager may programmatically engage any two or all extraction engines in parallel or in sequence. Each extraction engine may be configured to extract a different category of data or metadata from the media file. The extracted data may be combined before or after storage, or it may be harvested, packaged, reformatted or restructured before or after being stored, analyzed, or evaluated. Additionally, the likelihood or similarity ratios or values returned at 217 may be computed as a percentage or using some other similarity metric known in the art or yet to be developed to represent how likely the selected media file of interest is derived from, is related to, or is otherwise similar to a predetermined media file stored in the library, where the library is comprised of media file identifiers generated from previously processed media files.

Because the generated media file identifier characterizes, corresponds to, or may in some cases, uniquely represent a particular media file, the media file identifier generated by this invention may serve as a signature, fingerprint, or VideoDNA™ of a media file. Accordingly, while determining the likelihood of a relationship or degree of similarity between media files is one application of the media file identifiers generated by this invention, the media file identifiers may also be used in other applications requiring accurate and reliable identification, characterization, or comparison of media files.

Figure 3:
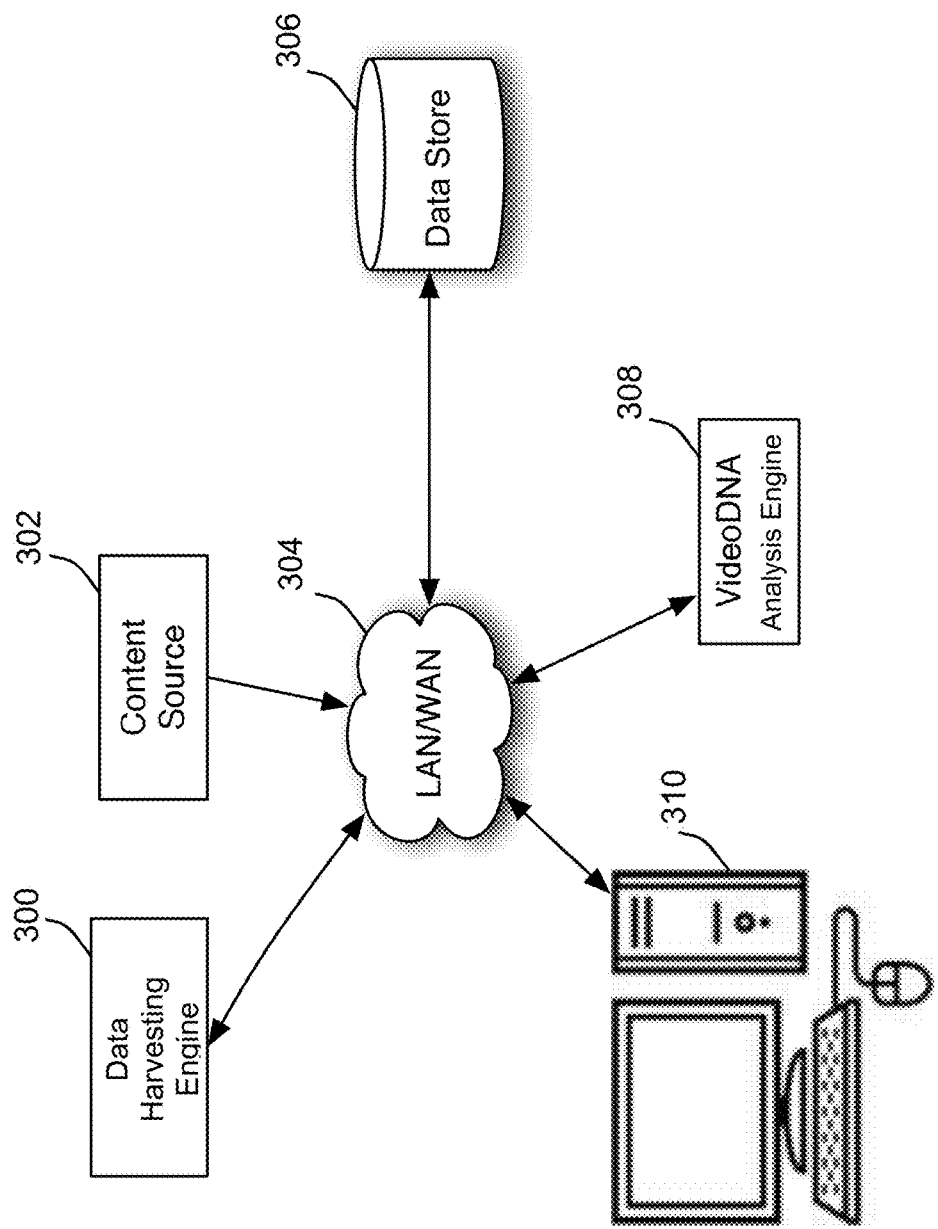
FIG. 3 is a schematic diagram illustrating an example of an operational environment for an embodiment of a system as disclosed herein.

FIG. 3 illustrates a schematic of an exemplary operational environment for a preferable embodiment of a data and metadata harvesting and analysis system as disclosed herein. A data harvesting mechanism, Data Harvesting Engine 300, can communicate with a source of digital content, Content Source 302, through a communication protocol or network, LAN/WAN 304. Data Harvesting Engine 300 can put the harvested data in a data store, Data Store 306. The harvested data and metadata can be analyzed or evaluated by VideoDNA™ Analysis Engine 308, which can compare the data and metadata extracted and harvested from a particular data source to data and metadata extracted and harvested from other data sources. The analysis or evaluation may then be reviewed using a computer interface system 310.

Content Source 302 may be any device or system capable of storing or hosting files or data represented in some other fashion. Notably, the performance of the method and implementation of the system as disclosed herein are independent of data format. In particular, the relevant file formats that are returned as a result of searching for similar content in the data store using the media file identifiers generated by an exemplary system as disclosed herein may be of any data format known in the art or yet to be developed.

LAN/WAN 304 may be any local area network (LAN) or wide area network (WAN). When LAN/WAN 304 is configured as a LAN, the LAN may be configured as a ring network, a bus network, a wireless local network and/or any other network configuration. When LAN/WAN 304 is configured as a WAN, the WAN may be the public-switched telephone network, a proprietary network, the public access WAN commonly known as the Internet, and/or any other WAN configuration.

Regardless of the actual network used in a particular embodiment, data may be exchanged over LAN/WAN 304 using various communication protocols. For example, transmission control protocol/Internet protocol (TCP/IP) may be used if LAN/WAN 304 is the Internet. Proprietary image data communication protocols may be used when LAN/WAN 304 is a proprietary LAN or WAN. Although FIG. 3 shows the VideoDNA™ Analysis Engine 308 as connected through the LAN/WAN to network-coupled Content Source 302, Data Harvesting Engine 300, and Data Store 306, it should be noted that FIG. 3 represents merely one embodiment of the present invention and that VideoDNA™ Analysis Engine 308 is not dependent upon network connectivity. In addition, Data Store 306 may be of any database or data storage variety.

The various portions of VideoDNA™ Analysis Engine 308 as well as the underlying metadata harvesting mechanism, Data Harvesting Engine 300, may be implemented in hardware, software, firmware, or combinations therefor. In a preferable embodiment, VideoDNA™ Analysis Engine 308 is implemented using a combination of hardware and software or firmware that is stored in memory and executed by a suitable instruction execution system. If implemented solely in hardware, as in an alternative embodiment, for example, the VideoDNA™ Analysis Engine 308 may be implemented with any or a combination of technologies that are well-known in the field, including: discrete logic circuits, application-specific integrated circuits (ASICs), programmable gate arrays (PGAs), field programmable gate arrays (FPGAs), etc.), or other technologies known in the art or yet to be developed.

Figure 4:
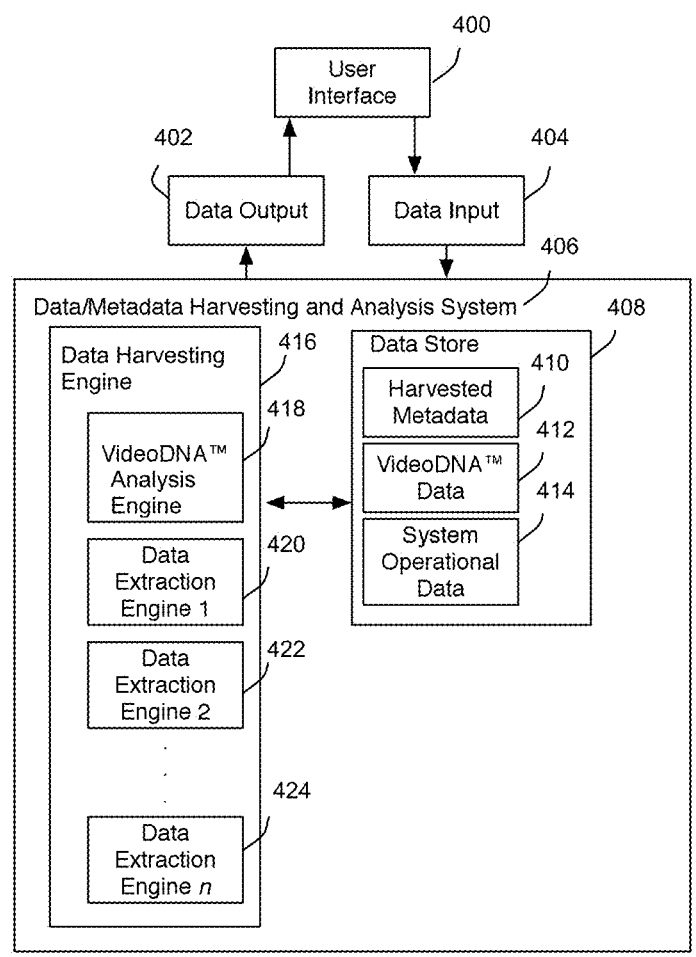
FIG. 4 is a block diagram showing a number of functional components of an embodiment of a system as disclosed herein.

FIG. 4 is a block diagram showing a number of functional components of an embodiment of a system as disclosed herein. Specifically, the system of FIG. 4 comprises: a graphical user interface, User Interface 400; a data receiving and input device, Data Input 404; a data receiving and output device, Data Output 402; and a data and metadata harvesting, extraction, analysis, evaluation, and storage system, Data/Metadata Harvesting and Analysis System 406. In a preferable embodiment, Data/Metadata Harvesting and Analysis System 406 can further comprise: a data harvesting mechanism, Data Harvesting Engine 416, which in turn can comprise a VideoDNA™ Analysis Engine 418 and at least two but preferably more than two extraction engines, Data Extraction Engines 420, 422, and 424. The Data/Metadata Harvesting and Analysis System 406 can also comprise a data storage device, Data Store 408, where Harvested Metadata 410 and System Operational Data 414 can reside. Data Store can further comprise the VideoDNA™ Data 412, which will be discussed in further detail below.

In a preferable embodiment, the user can provide a media file by interacting with User Interface 400 to provide a media file to the system via Data Input 404. Data Harvesting Engine 416 can manage the data extraction process performed on the media file received via Data Input 404. Data Extraction Engines 420, 422, and 424 may each be configured to generate a different type or category of data or metadata based on the same data source or media file. An extraction engine may be configured to extract a particular type of data or metadata. For example, an extraction engine may be configured to extract the size of a file. Since all files have a size attribute, an extraction engine configured to extract the size of a file can be applied to any type of file. Other extraction engines can be file-based. For example, an extraction engine configured to extract facial recognition attributes in order to, for example recognize a celebrity, can be applied to a video file or a photo, but cannot be applied to a text file.

In addition, a media file can have a mime type that enables identification of the type of file it is—for example, whether it is an audio file, a document, a text file, an application or a video file. The type of file can be used to determine which extraction engines apply. Thus, as described above, an extraction engine configured to extract file size can apply to all of the aforementioned examples, but one configured for facial recognition might apply to a video file, but not to, for example a text file or an audio file.

The data and metadata extracted by Data Extraction Engines 420, 422 and 424 can be stored in Data Store 408 as Harvested Metadata 410 and may reside in any form alongside any other relevant data to the system or environment, shown in FIG. 3 as System Operational Data 414. VideoDNA™ Analysis Engine 418 runs as a function of Data Harvesting Engine 416, taking as input Harvested Metadata 410 and generating a media file identifier, which is stored as VideoDNA™ Data 412 in Data Store 408. This process may be repeated for any number of predetermined media files to generate a library or a set of media file identifiers for each processed media file, which can be stored as VideoDNA™ Data 412.

To determine the likelihood or similarity ratio that a selected media file of interest is related to one or more of the predetermined media files previously processed by an embodiment of the system as described above, a user may provide a selected media file of interest by interacting with User Interface 400 to provide the selected media file of interest to the system via Data Input 404. Data Harvesting Engine 416 manages the data extraction process performed on the selected media file of interest received via Data Input 404. Using the same data extraction process performed on the predetermined media files, Data Extraction Engines 420, 422, and 424 extract data or metadata from the selected media file of interest. The data and metadata extracted by Data Extraction Engines 420, 422 and 424 are stored in Data Store 408 as Harvested Metadata 410 and may reside in any form alongside any other relevant data to the system or environment, shown in FIG. 3 as System Operational Data 414. VideoDNA™ Analysis Engine 418 runs as a function of Data Harvesting Engine 416, taking as input Harvested Metadata 410 and generating a media file identifier for the selected media file of interest, which is stored as VideoDNA™ Data 412 in Data Store 408. Next, VideoDNA™ Analysis Engine 418 compares the media file identifier of the selected media file of interest to the media file identifiers of each of the predetermined media files previously processed by the system and returns a likelihood value or similarity ratio representing how similar the selected media file of interest is to each predetermined media file. The likelihood value or similarity ratio may be returned either in percentage form or in the form of some other similarity metric known in the art. Data Output 402 receives the likelihood values or similarity ratios for each comparison made between the selected media file of interest and each of the predetermined media files, the results of which may be accessed by the user via User Interface 400.

To effectively return a meaningful result, VideoDNA™ Analysis Engine 418 may consider one or more, types, categories, sets, or subsets of Harvested Metadata 410. In particular, VideoDNA™ Analysis Engine 418 may compare a particular subset of metadata to some or all of the other different subsets of metadata accessible to the Data/Metadata Harvesting and Analysis System 406. Moreover, VideoDNA™ Analysis Engine 418 may determine to what extent a selected media file of interest is related to one or more predetermined media files by comparing various aspects of some or all the harvested data or metadata, including but not limited to data extracted from: video picture identification; object identification; audio waveform analysis, face recognition, face detection, voice recognition, spoken language detection, or other technologies known in the art or later developed. VideoDNA™ Analysis Engine 418 may also compare certain aspects of other extracted data or metadata such as file creation information or embedded metadata sets such as the Exchange Image File Format (EXIF).

VideoDNA™ Analysis Engine 418 may determine the specific types, categories, sets, or subsets of data or metadata to be compared, analyzed, evaluated, or utilized for generating media file identifiers using various criteria about the data type of the data source file. For example, data type may include a classification of the media upon which the acquired digital data originated. In particular, digital documents may have been recorded via a video camera or otherwise acquired from various media devices corresponding to different media classifications (e.g. "video tape", "digital video disc," and "file system"). Information reflective of the media classification may be used in selecting the type or category of data or metadata to be used in generating the media file identifiers. In other cases, it may be possible to fine tune or to otherwise adjust the algorithm used by VideoDNA™ Analysis Engine 418 in order to achieve more accurate results.

The data input device, Data Input 404, may be a mounted file system via a connection technology such as the Common Internet File System (CIFS) or Network File System (NFS) or any technology known in the art or yet to be developed. The data storage device, Data Store 408, may be any structured database, unstructured database, relational database, operational database, database warehouse, distributed database, end-user database, or any database or data storage device known in the art or yet to be developed. In addition, the various other elements of Data/Metadata Harvesting and Analysis System 406, including VideoDNA™ Analysis Engine 418, may be stored and operative on a single computing device or alternatively, may be distributed among several memory devices under the coordination of one or more computing devices.

Moreover, various information, including but not limited to VideoDNA™ Data 412 that is generated by VideoDNA™ Analysis Engine 418, may be used to form a knowledge base that may reside in Data Store 408 or as a separate functional component. Regardless of the actual implementation, the knowledge base may contain information that VideoDNA™ Analysis Engine 418 may use in an unlimited fashion to improve its own accuracy, or to evaluate new data sources or files to be analyzed or evaluated.

Video standards may include embedded metadata such as, for example, high dynamic range (HDR) metadata standards, Exchange Image File Format (EXIF), Dublin Core, Encoded Archival Description (EAD), IEEE LOM (Learning Object Metadata), Machine-Readable Cataloguing (MARC), or other standards known in the art. VideoDNA™ Analysis Engine 418 may use an abstract set of standards that are independent of any particular format. By using an abstract set of data-interchange standards, VideoDNA™ Analysis Engine 418 may implement any algorithm configured to determine an identifier or characterization of a file based on its extracted data or metadata, including for example, algorithms configured to determine a fingerprint, signature, VideoDNA™, or other media file identifier of a media file.

In an alternative embodiment, for example, in the case where the source data takes the form of an audio file, the data-interchange standards described above may be replaced in part or in their entirety by a set of appropriate data-interchange standards suited for characterizing digital audio data as opposed to digital video data. Additionally, other data-interchange standards may be selected to accommodate other types of data, for example, photos, film, graphics, text documents, formatted data-feeds, formatted database exports, or other types of data known in the art or yet to be developed.

While the functional block diagram in FIG. 4 depicts a VideoDNA™ Analysis Engine 418 having a single centrally-located Harvesting Engine 416, Data Store 408, and Data Input 404, it should be appreciated that the various functional components or elements of FIG. 4 may be distributed across multiple locations (e.g., with J2EE, .NET, enterprise Java beans, Hadoop clustering, or other distributed computing technology). For example, the various algorithms used in VideoDNA™ Analysis Engine 418 may exist in different locations—on different servers, on different operating systems, or in different computing environments—as a result of the flexibility provided by the fact that the algorithms interact only via common interchange data (e.g., JSON.).

Figure 5:
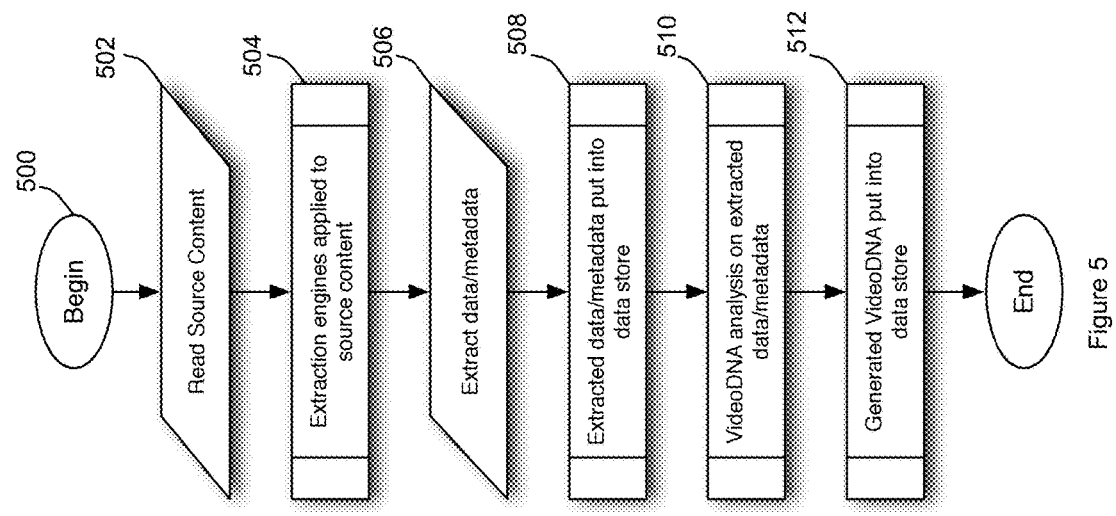
FIG. 5 is a flowchart showing an example of a programmatic application of an embodiment of a method as disclosed herein.

FIG. 5 is a flowchart showing an example of a programmatic application of an embodiment of a method as disclosed herein for generating media file identifiers, fingerprints, signatures, or VideoDNA™ data, and storing these identifiers, fingerprints, signatures, or VideoDNA™ data in a library. The method begins at 500 upon providing a media file as source data, which may be read for its content at 502. Next, the source data received in 502 may be analyzed or evaluated and may interact with extraction engines, which are applied to the source content at 504. The data or metadata are extracted and harvested at 506 after which they are put into a data store at 508. The extracted and harvested data or metadata may be received from the data store at 510 by either a push request, a pull request, as a data-interchange format, or via some other communication protocol known in the art. A media file identifier, fingerprint, signature, or VideoDNA™ data is generated at 510 for the media file provided at 500, and the result may be output either as text, a data-interchange format, or some other format known in the art into the data store at 512.

Figure 6:
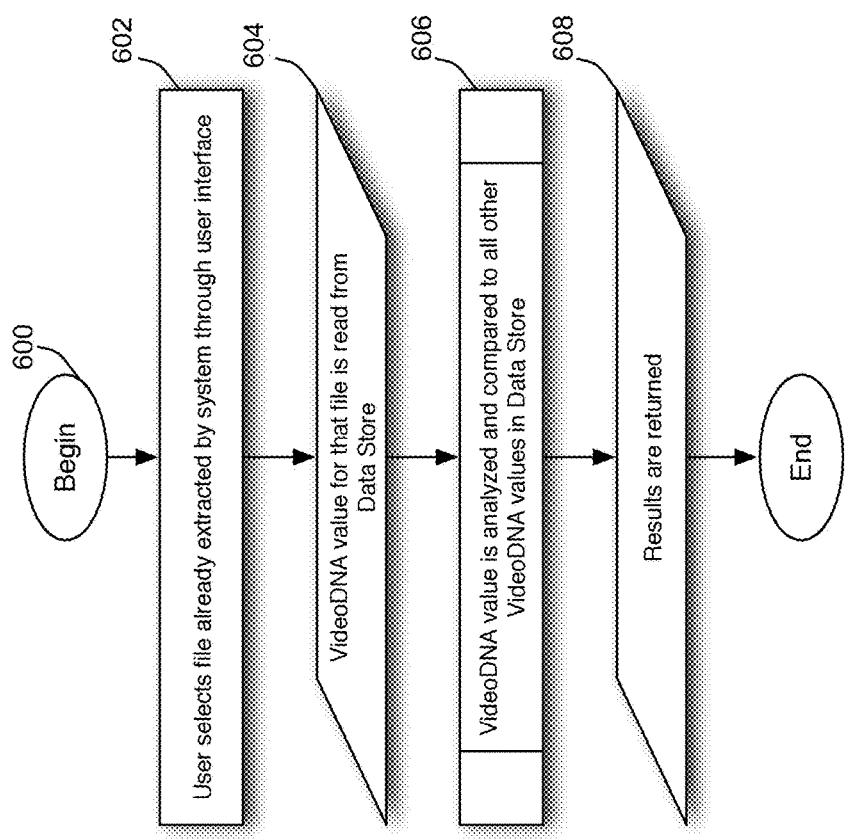
FIG. 6 is a flowchart showing an example of a user query to an embodiment of a system as disclosed herein.

FIG. 6 is a flowchart showing an example of a user query to an embodiment of a system as disclosed herein. In particular, FIG. 6 shows a number of steps in the application of an exemplary method for engaging the VideoDNA™ Analysis Engine to determine the likelihood or similarity ratio of whether a selected media file of interest is related to a set of predetermined media files previously analyzed or evaluated by the VideoDNA™ Analysis Engine. The method begins at 600 at the initiation of a user who wishes to perform an analysis or evaluation for a selected media file of interest. The user or other programmatic interface (e.g., an API command, etc.) provides or identifies a data source (e.g., a selected media file of interest) at 602 through any method and via any device known in the art or yet to be developed, including but not limited to a user interface or a programmatic command. In this embodiment, the data source selected at 602 will be compared to some or all of the results of other data sources that have already been provided and processed by the VideoDNA™ Analysis Engine as depicted in the flowchart of FIG. 5.

Note that the method as described by the flowchart of FIG. 6 presumes that the selected media file of interest has already been processed by the method depicted in the flowchart of FIG. 5. In other words, the flowchart in FIG. 6 presumes that a media file identifier, fingerprint, signature, or VideoDNA™ data has already been generated and is stored in the data store as VideoDNA™ Data. Thus, in selecting a media file as a data source at 602, attention is directed to step 604 in this embodiment where the results from the VideoDNA™ Analysis Engine (i.e. the media file identifiers) already reside as VideoDNA™ Data, having been put there by the method described in FIG. 5. An exemplary system as disclosed herein thus analyzes, evaluates, and compares in step 606 the selected media file of interest's media file identifier or VideoDNA™ value to the respective media file identifiers or VideoDNA™ values of other predetermined media files, determining the similarity of the selected media file of interest to some or all the predetermined media files already analyzed or evaluated by an exemplary system as disclosed herein. The results of the comparison are returned at 608.

The similarity between any two files may be captured by a likelihood or similarity ratio or value that may be returned either in percentage form or in the form of some other similarity metric known in the art or yet to be developed. The results of the comparison performed in 606 may be presented at 608 programmatically through a data-interchange format (e.g. JSON), visually through a user interface, a combination herein of the two, or by any other means known in the art or yet to be developed.

An exemplary system as disclosed herein may be implemented via a combination of a computing device with a local data storage device. This device may be an internal hard-disk drive, a magnet tape drive, a compact-disk drive, and/or other data storage devices known in the art or yet to be developed that can be made operable with a computing device. In addition, software instructions and/or data associated with the VideoDNA™ Analysis Engine may be distributed across several of the above-mentioned data storage devices.

The VideoDNA™ Analysis Engine may be implemented via a combination of software and data executed and stored under the control of a computing processor. It should be noted, however, that an exemplary system as disclosed herein is not dependent upon the nature of the underlying computer in order to accomplish the designated functions.

Figure 7:
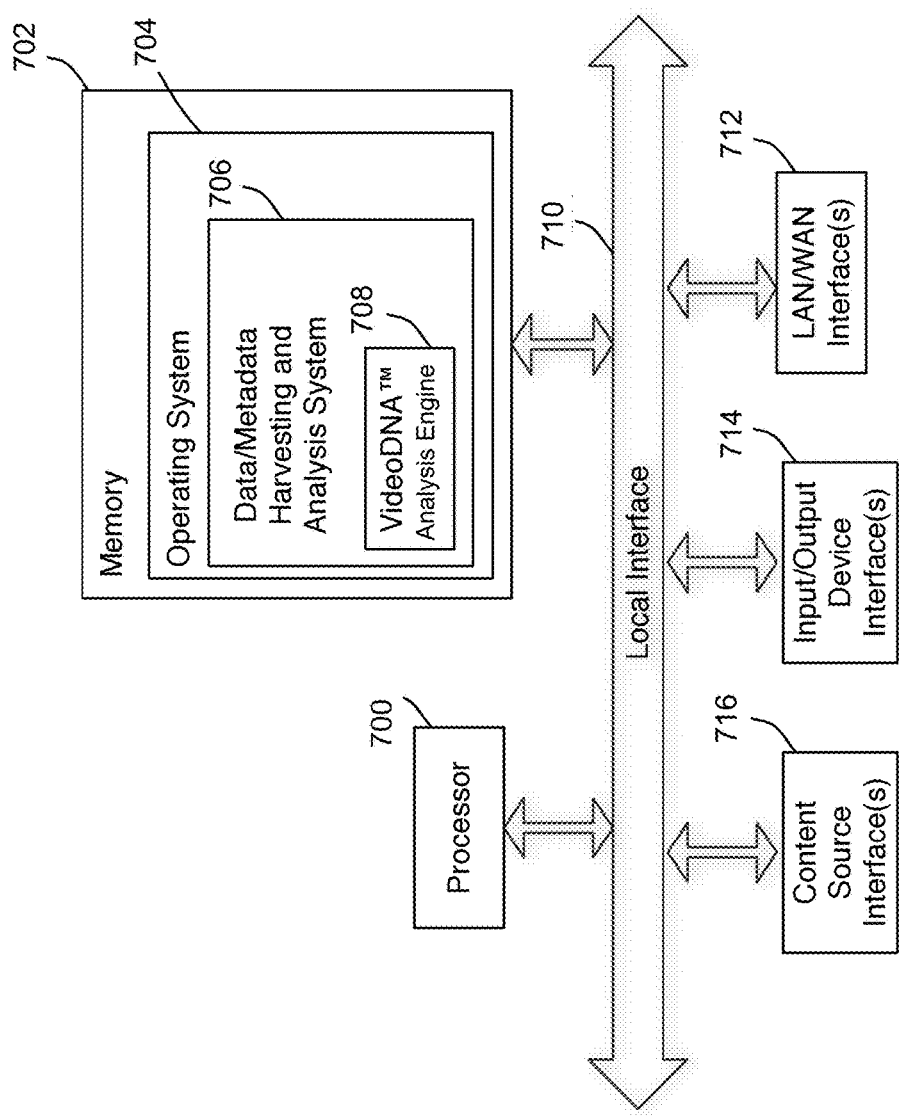
FIG. 7 is a schematic diagram illustrating an example of a computing device running an embodiment of the system as disclosed herein.

FIG. 7 is a schematic diagram illustrating an example of a computing device running an embodiment of an exemplary system as disclosed herein. Generally, in terms of hardware architecture, the computing device may comprise: a computer processing device, Processor 700; a memory or data storage device, Memory 702; one or more data interfaces, Content Source Interface(s) 716; one or more devices to receive and to output data, Input/Output Device Interface(s) 714; and one or more network interfacing devices, LAN/WAN Interface(s) 712, that are communicatively coupled via a communication device, Local Interface 710. Local Interface 710 may comprise one or more buses or other wired or wireless connections as known in the art or yet to be developed. Local Interface 710 may also comprise additional elements (not shown) to enable communications such as, for example, controllers, buffers (caches), drivers, repeaters, and receivers. In addition, Local Interface 710 may further comprise address, control, and/or data connections to enable appropriate communications among the various components.

Processor 700 may be a hardware device for executing software that may be stored in Memory 702. Processor 700 may be any custom-made or commercially-available processor, a central processing unit (CPU), or an auxiliary processor among several processors associated with the computing device, a semi-conductor-based microprocessor (in the form of a microchip), or a macroprocessor.

Memory 702 may include any one or a combination of volatile memory elements including for example, random access memory (e.g. RAM, such as dynamic RAM or DRAM, static RAM or SRAM), nonvolatile memory elements (e.g. read-only memory (ROM), hard drives, tape drives, compact discs (CD-ROM)), or other memory elements known in the art or yet to be developed. In particular, Memory 702 may incorporate electronic, magnet, optical, and/or other types of storage media known in the art or yet to be developed. Note that Memory 702 may have a distributed architecture, wherein various components are situated remotely from one another but can still be accessed by Processor 700.

The software in Memory 702 may include one or more separate programs, each of which comprises an ordered listing of executable instructions for implementing logical functions. As depicted in FIG. 7, the software in Memory 702 comprises Operating System 704, which comprises Data/Metadata Harvesting and Analysis System 706, which comprises VideoDNA™ Analysis Engine 708. VideoDNA™ Analysis Engine 708 functions as a result of and in accordance with Operating System 704.

A preferable embodiment may comprise one or more source programs, executable programs (object code), scripts, or other collections each comprising a set of instructions to be performed. In addition, VideoDNA™ Analysis Engine 708 may be written in a number of programming languages known in the art or yet to be developed. Operating System 704 may control the execution of other computer programs, such as Data/Metadata Harvesting and Analysis System 706, and may provide scheduling, input-output control, file and data management, memory management, system configuration, and communication control and related services.

Input/Output Device Interface(s) 714 may take the form of human/machine device interfaces for communicating via various devices, such as for example, a keyboard, a mouse or other suitable pointing device, a microphone, or other devices known in the art or yet to be developed. Input/Output Device Interface(s) 714 may also comprise various output devices, for example, a printer, a monitor, an external speaker, or other output devices known in the art or yet to be developed.

LAN/WAN Interface(s) 712 may include a host of devices that may establish one or more communication sessions between, for example, the computing device as depicted in FIG. 7 and the LAN/WAN 304 as depicted in FIG. 3. Additionally, LAN/WAN Interface(s) 712 may include various two-way communication devices (not shown) such as: a modulator/demodulator or modem (for assessing another device, system, or network); a radio frequency (RF) or other transceiver; a telephonic interface; a bridge; an optical interface; a router; or other two-way communication devices known in the art or yet to be developed.

When the computing device of FIG. 7 is in operation, Processor 700 may be configured to execute software stored within Memory 702, to communicate data to and from Memory 702, and to generally control operations of the computing device pursuant to the software. VideoDNA™ Analysis Engine 708 and Operating System 704 may be read in whole or in part by Processor 700, may be subsequently buffered within Processor 700, and may be executed.

Figure 8:
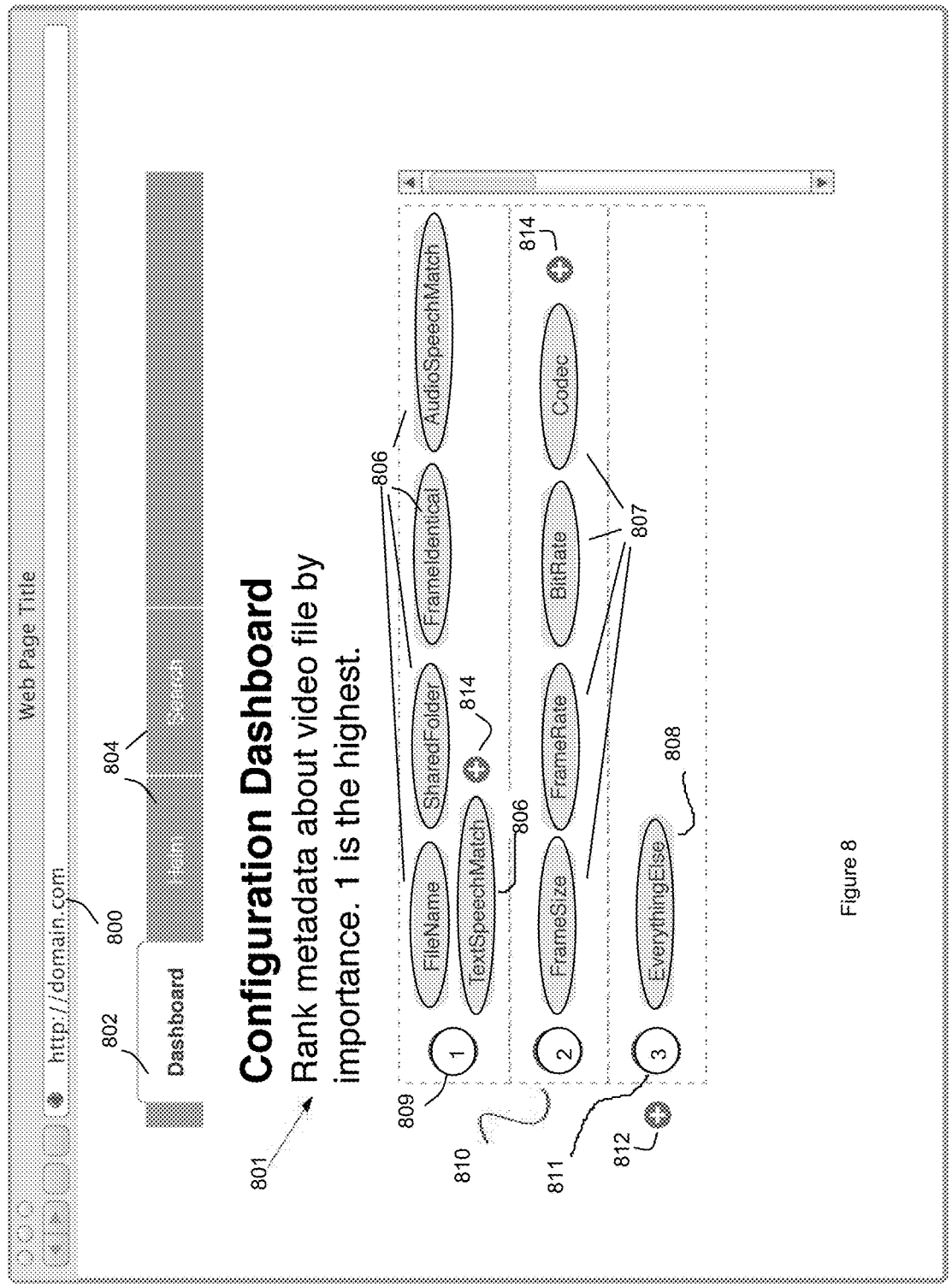
FIG. 8 shows an exemplary graphical interface for an embodiment of a system as disclosed herein.

FIG. 8 shows an exemplary graphical interface for an embodiment of the invention. The interface represented in FIG. 8 may be configured to provide a user the ability to configure various comparison algorithms that may be used in different embodiments of the invention (i.e. various algorithms that may be implemented in VideoDNA™ Analysis Engine at 510 and 708 as depicted in FIG. 5 and FIG. 7 respectively) by allowing the user to rank sets of extracted metadata according to their relative importance with respect to characterizing a particular file. The ranking process enables the user to modify, adjust, or customize the comparison algorithm in order to adjust the weight or consideration afforded to certain sets or subsets of data or metadata according to their respective ranking. Alternatively, the ranking process may be automated such that the system is configured to rank sets of extracted data automatically, for instance, through use of a set of rules. Automatic rankings assigned to data sets can subsequently be changed or revised by the user.

In a preferable embodiment, a user may access a page of the interface as depicted in FIG. 8 by pointing any web browser, HTML viewer, or graphical application to the appropriate domain or hosted address 800. Users may access various features of this interface in a myriad of ways, including by selecting an appropriate navigation element, represented graphically by the tab 802 in FIG. 8. Other navigation elements, represented by tabs 804, may allow the user to access other interactions, features, and functionality provided by an exemplary system as disclosed herein.

For example, a user may interact with the Configuration Dashboard 801 shown in FIG. 8 to rank the data or metadata subsets 806, 807, and 808 that an exemplary system as disclosed herein may use to determine the likelihood or similarity ratio that two or more files are related to one another. The rank may be designated by a number, for example as shown at 809, 810, and 811, and the interface may provide the ability to group different types, categories, sets, or subsets of metadata 806, 807, and 808, so that all metadata sets or subsets in a particular grouping are given the same ranking. Other metadata sets or subsets may be added to a particular grouping having a designated ranking with a button, for example, as shown by 814. A user may add as many ranks or ranking designations as desired or required for a particular implementation, grouping or separating data and metadata sets or subsets into different ranks or ranking designations that assign a relative weight in how each set or subset is considered by the algorithm implemented in a VideoDNA™ Analysis Engine as disclosed herein. Adding a new rank or ranking designation may be accomplished by a button 812. The rank or prioritization assigned to each data or metadata set or subset may be maintained and saved for later use by storing the rank or ranking designation in the same server, location, or database as other elements of the computing device depicted in FIG. 7, for example, where 702, 704, 706, and 708 reside.

For an example, FIG. 8 shows a representation of a configuration dashboard page of a graphical interface of an embodiment of the invention where the metadata subsets 806 have been given the same ranking 809, designated by the number 1, metadata subsets 807 have been given the same ranking 810, designated by the number 2, and metadata subsets 808 have been given the same ranking 811, designated by the number 3. Accordingly, in this example metadata subsets 806 will be given equal weight or consideration with respect to each other, but may be given greater weight or consideration than metadata subsets 807 and 808 by the algorithm implemented in a VideoDNA™ Analysis Engine as disclosed herein. Similarly, metadata subsets 807 will be given equal weight or consideration with respect to each other, but may be given greater weight or consideration than metadata subsets 808 by the algorithm implemented in a VideoDNA™ Analysis Engine as disclosed herein. The relative weight or consideration given to any particular metadata set may have an impact on the characteristic media file identifier, fingerprint, signature, or VideoDNA™ data generated for a media file and may accordingly also impact the result of comparing the media file identifiers for key similarities and differences to determine the nature of any relationship between two media files.

Typical video content contains several different sources of metadata that can be used to better distinguish and more uniquely identify the video content when the data or metadata are extracted, combined, and evaluated to provide a media file identifier as described herein. For example, most major motion picture studios distribute tens of thousands of different versions of the same title or work—these can include, for instance, an airline version with Chinese subtitles, a European version dubbed in French, a version with different product placement, and various other alternative versions. These versions of multiple titles can be scanned and the data and metadata of each version of each title can be harvested, extracted, analyzed and evaluated by the method and system as disclosed herein. In a preferable embodiment, a set or subset of metadata that might be selected for use or ranked at a higher priority (for example, with a ranking of 1), would include the actors who appear in each title, unique songs that are in each title, scenes or objects detected in each title, the duration of each title, and landmarks or locations detected to a similar version of the desired title or original work. In this example, irrelevant titles and versions can be filtered out by using or ranking these particular sets or subsets of metadata. This filtering of irrelevant titles and versions allows the user to locate a desired version based on relating the desired version to another similar version saved in the system. Accordingly, the use of the aforementioned sets or subsets of metadata can provide for a more unique or distinguishing identifier which can subsequently result in more accurate similarity ratios.

In addition, one might start with several types of media files including raw video files, raw audio files, and a script. The goal might be to search for a particular phrase contained in any or all of these media files. An extraction engine can be configured to extract speech-to-text and would thus convert the speech in the raw video and raw audio files into text. Another extraction engine might be configured to extract text from a pdf file or other type of text file. The text extracted from the different types of files can then be compared using the method and system disclosed herein to search for the particular phrase of interest and a similarity ratio can be determined based on comparing a selected media file of interest to other media files of different types. Similarly, other types of metadata, including for example certain actors or certain objects in a scene, can be extracted in this manner using a corresponding extraction engine (e.g. for facial or object recognition) configured to extract that particular type of metadata.

Figure 9:
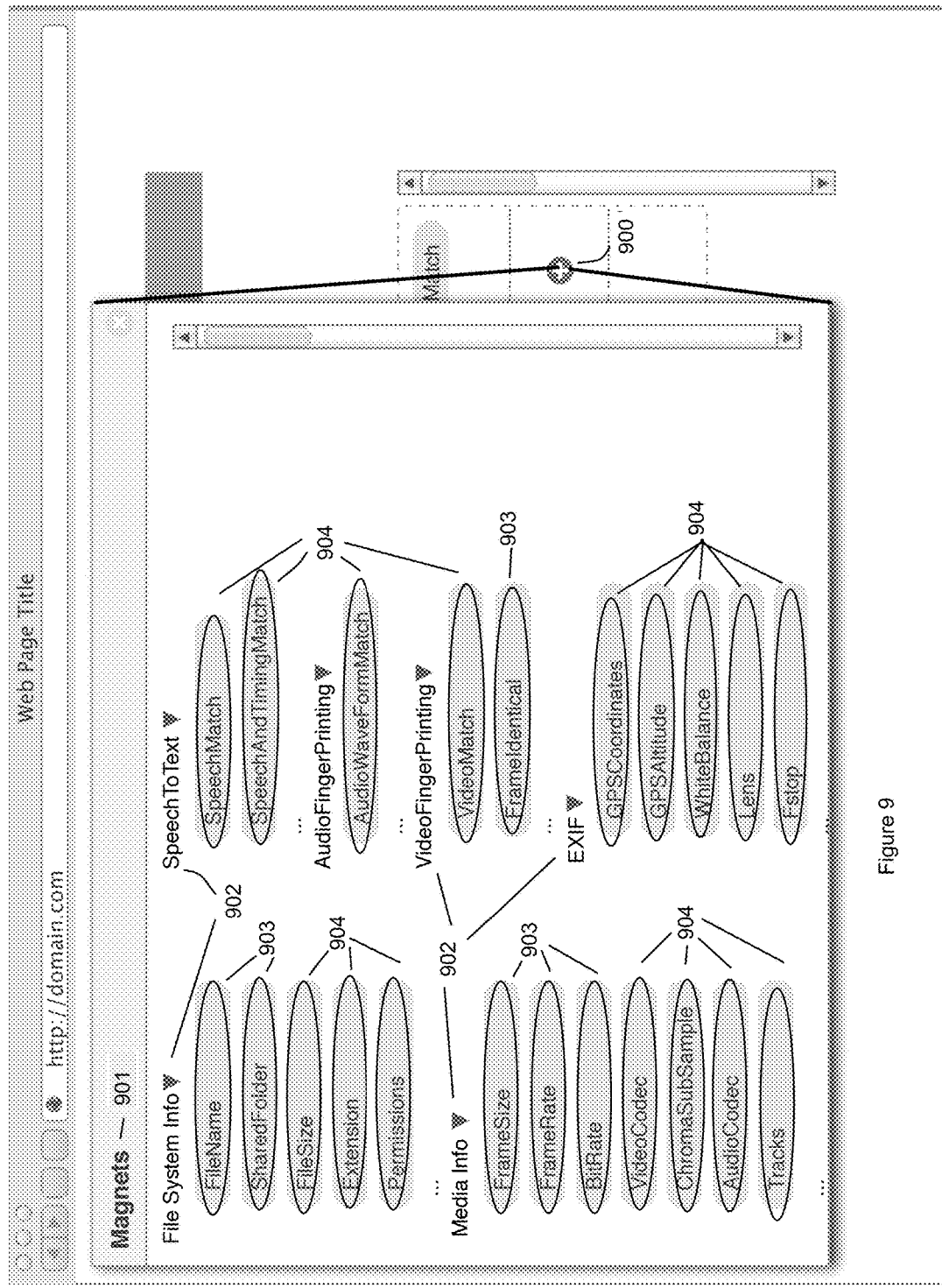
FIG. 9 shows a view of the graphical interface of FIG. 8 after a user interaction.

FIG. 9 shows a view of the graphical interface of FIG. 8 after a particular user interaction. In the example as depicted in FIG. 9, the graphical interface is shown after the user has engaged a button or link 814, to add other metadata sets to the ranked groups of metadata sets shown in FIG. 8. In this example, the metadata subsets are listed and organized in sets or categories 902 corresponding to different types of metadata. Note that the listing shows both the metadata subsets 903 that have been previously selected and ranked as shown in FIG. 8, as well as unselected metadata subsets 904 that have not been ranked. Each subset and/or category 902 of metadata may be extracted by different extraction engines or Magnets 901. Examples of metadata subsets obtained using the extraction engines include: filename, originating directory or directory structure, file size, file extension (e.g., .PDF, .MOV, .TXT, etc.), file system permissions, video frame size (e.g., 1920 pixels by 1080 pixels, etc.), video frame rate, video bitrate, wrapper and essence format combination, audio dialogue or speech, languages spoken or used, audio or video fingerprint, and global positioning coordinates. In a preferable embodiment, as described for instance in the example above for different versions of the same title or work, data or metadata subsets obtained using the extraction engines can include actors who appear in each title, unique songs that are in each title, scenes or objects detected in each title, the duration of each title, and landmarks or locations detected to a similar version of the desired title or original work. The interface to select and add metadata subsets and/or categories may appear as a popup window, modal, new page, or any other interface or visual representation known in the art or yet to be developed.

In a preferable embodiment, users may add metadata subsets to the ranked groups of FIG. 8 by selecting one or more of the unselected metadata sets 904. Once selections for a specific rank are made, these metadata sets may no longer be available to add to subsequent ranks. A default last rank may include a representation of all of the remaining, unselected metadata subsets to be considered by the algorithm implemented in a VideoDNA™ Analysis Engine as disclosed herein.

In some embodiments, the ranking process can be performed automatically by the Analysis Engine, which can be configured to assign a ranking to the extracted data or metadata, or to the subsets of data or metadata according to a set of rules. The rankings can subsequently be adjusted or changed by a user as described above.

Figure 10:
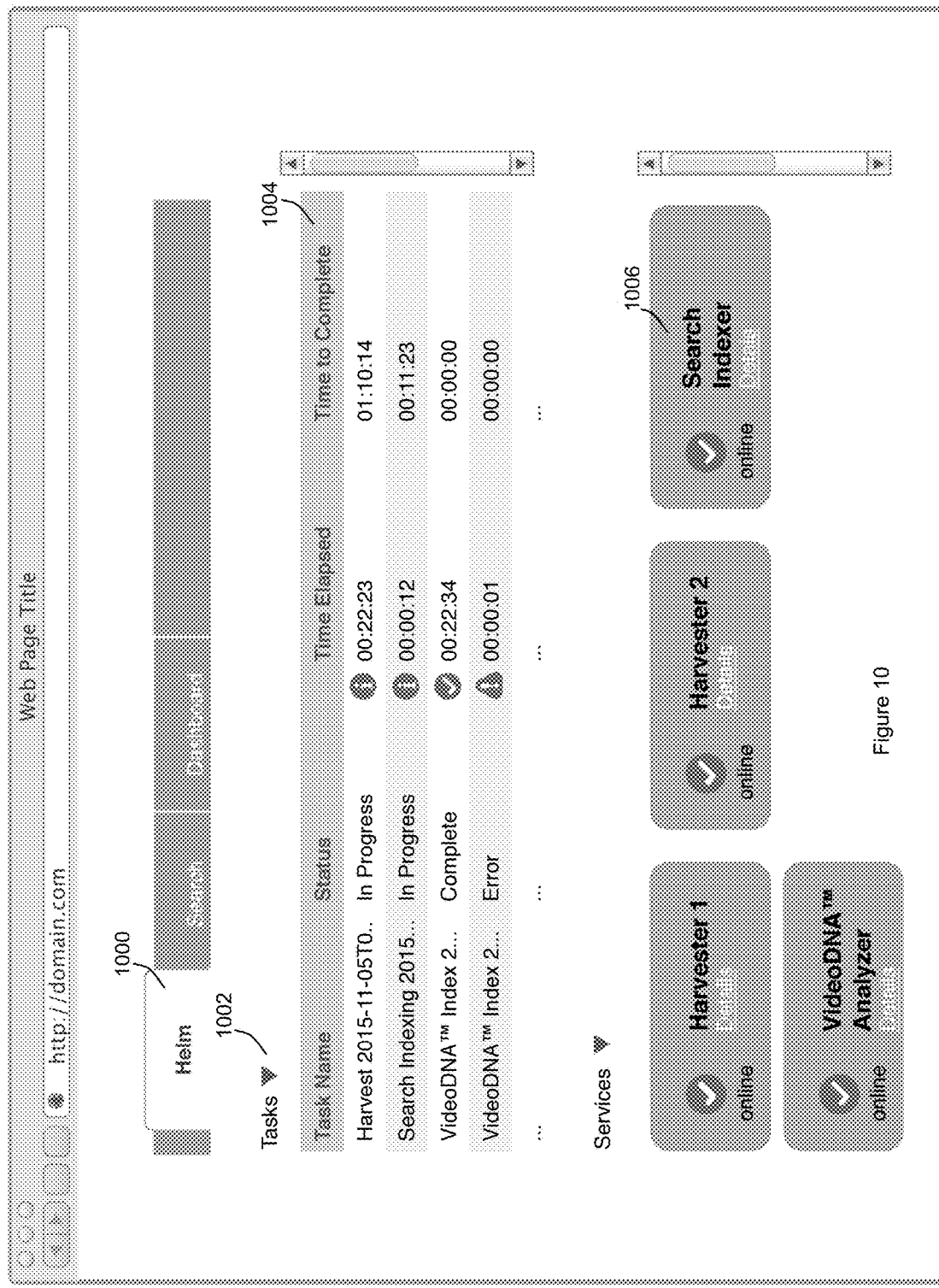
FIG. 10 shows another view of the graphical interface of FIG. 8 after a different user interaction.

FIG. 10 shows another view of the graphical interface of FIG. 8 after a different user interaction than the one previously described. In the example as depicted in FIG. 10, the graphical interface is shown after the user has selected or engaged one of the navigation elements or tabs 804 in FIG. 8, in this case, the one that corresponds to tab 1000 in FIG. 10. A user may either navigate to tab 1000 of the graphical interface by selecting the appropriate navigation element or alternatively, may access tab 1000 directly by inputting its location or by pointing any web browser, HTML viewer, or graphical application to the appropriate domain or hosted address 800 as shown in FIG. 8. In this example, the tab 1000 in FIG. 10 entitled "Helm" may be used to provide a view of the various aspects, active or previous tasks, processes, services, or any other relevant operational information, related to an exemplary system as disclosed herein and the environment in which it operates. Different categories of information may be organized by heading or task name, which enables the user to expand or contract sections of this view using a dropdown selection button 1002. As shown in FIG. 10, a section regarding all current and previous tasks in the environment is displayed at 1004. Additionally, a section regarding all services managed by, connected to, or otherwise associated with the environment is displayed graphically at 1006. Thus, a view such as the one depicted in FIG. 10 may be used to display various aspects of information relevant to the system and accessed by the user.

Figure 11:
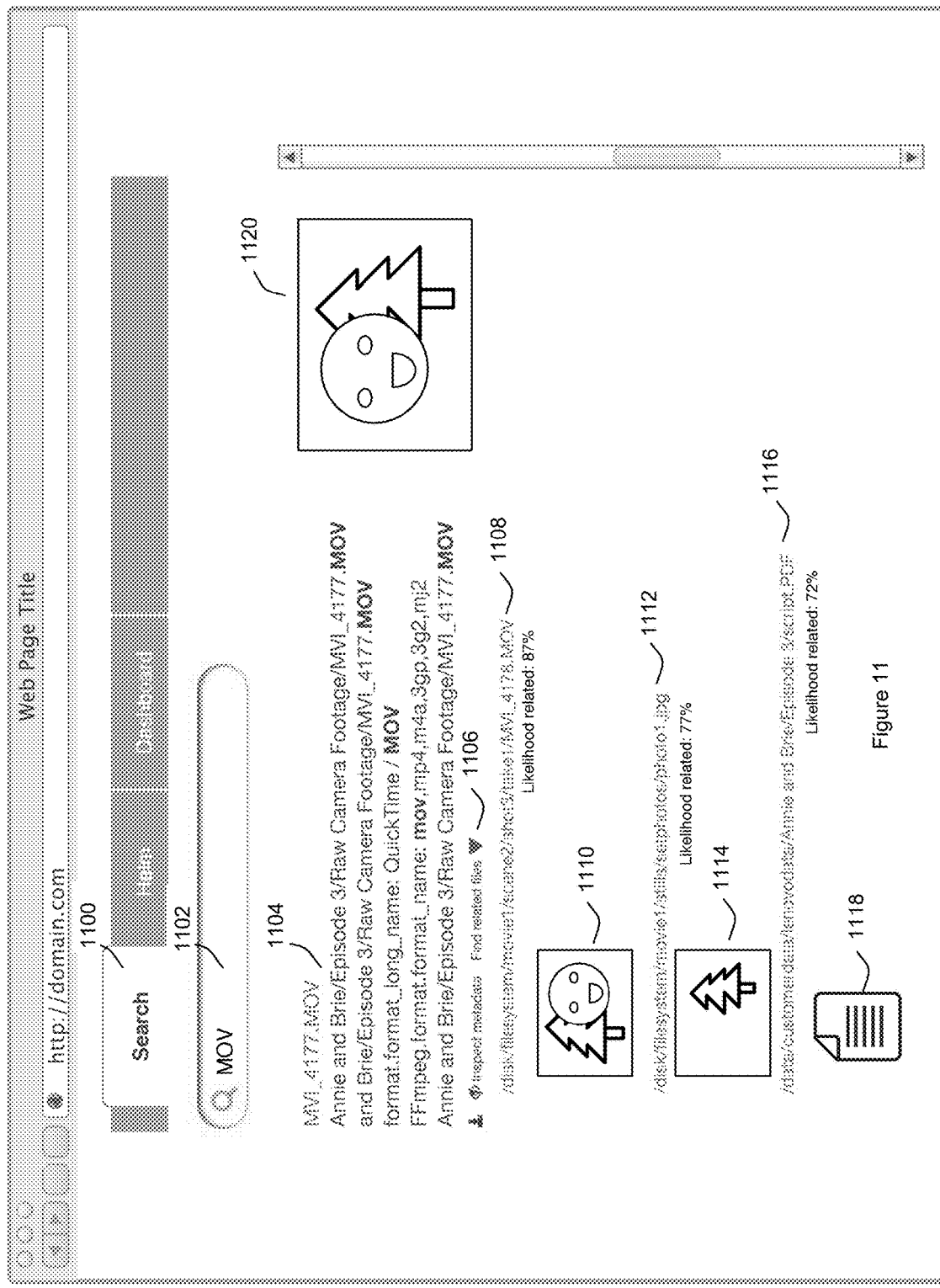
FIG. 11 shows another view of the graphical interface of FIG. 8 that depicts the results of applying an embodiment of a method and system as disclosed herein.

FIG. 11 shows another view of the graphical interface of FIG. 8 that displays a graphical view of the results of applying an exemplary method as disclosed herein. In the example as depicted in FIG. 11, the graphical interface is shown after the user has performed an exemplary method as disclosed herein as described and depicted in FIG. 5 and FIG. 6. In order to view the results of the analysis or evaluation, i.e. the likelihood values or similarity ratios returned at 218 as shown in FIG. 2 or at 608 as shown in FIG. 6, the user may select or engage one of the navigation elements or tabs 804 in FIG. 8, in this case, the one that corresponds to tab 1100 in FIG. 11. In this example, the selection of tab 1100 navigates the user to an interface allowing the user to provide input to, and to evaluate and act upon the results of performing an exemplary method as disclosed herein. As shown in FIG. 11, a user may search for and locate a desired asset, media file, or piece of content by utilizing a search function 1102. The data indexing, processing, algorithms, and functionality required to search the library, knowledge base, or data store of various entries of assets, media files, or data stored by the system depend on the data and metadata extraction, processing, and storing environment in which an exemplary system as disclosed herein operates.

Each result 1104 corresponding to a selected media file of interest may be displayed alongside a thumbnail 1120 of the selected media file of interest. Additionally, each result 1104 may be displayed as a direct link to the file that is represented, thus allowing a user to select the link and have direct access to the desired file. The link may be a universal naming convention (UNC) path, a hypertext markup language (HTML) path, a uniform resource locator (URL), or other type of link to the current or previous location of the relevant file known in the art or yet to be developed.

An expandable dropdown menu 1106 may provide access to a graphical display of the results of applying an exemplary method as disclosed herein. The results may be listed by decreasing likelihood or similarity value as a percentage or other similarity metric, or by any other sorting or ranking method known in the art or yet to be developed. In this example, the media file indicated at 1108 with associated thumbnail 1110 has a likelihood value of 87% of being related to the selected media file of interest 1104, while the media file indicated at 1112 with associated thumbnail 1114 has a likelihood value of 77%, and the media file indicated at 1116 with associated thumbnail 1118 has a likelihood value of 72%. Note that in this example, the results are listed in decreasing order by likelihood value or in order of closest similarity to the selected media file of interest, with the most similar file listed first. Similarity may be represented as a percentage, rank, description, score, or by other similarity metrics known in the art or yet to be developed. In addition, the similarity value may be displayed alongside the link to the media file and/or its associated thumbnail representation.

Moreover, there is no limit to the file format types that may be considered similar or related. For instance, the media file at 1112 with associated thumbnail 1114 may be a still photo taken from the same location or featuring the same background, objects, or scene as the selected media file of interest 1104. Similarly, the media file at 1116 and associated thumbnail 1118 may be a text document determined to be similar to selected media file of interest 1104 by an exemplary system as disclosed herein upon analysis, evaluation, and comparison of the text or other metadata extracted from the two files. The method and system disclosed herein is able to compare disparate file format types and provide a meaningful metric in the form of a similarity ratio that quantifies how similar one media file is to another media file even if they have different file format types.

The media files along with their determined likelihood values or similarity ratios returned as a result of applying an exemplary method and system as described herein and as represented in this example by 1104, 1108, 1112, and 1116 and associated thumbnails 1120, 1110, 1114, and 1118, respectively, or any other associated visual or non-visual representation, may be displayed in the graphical user interface to link directly to the actual file, asset, data, or content therein represented. For example, clicking, tapping, selecting, engaging, or otherwise interacting with the link 1108 may direct the user to an interface for accessing, playing, downloading, acquiring, restoring, or interacting with the actual media file represented or with the data itself.

An exemplary system as disclosed herein may be embodied in any computer-readable medium for use by or in connection with an instruction execution system, apparatus, or device, such as a computer-based system, processor-containing system, or other system that can fetch the instruction execution system, apparatus or device, and execute the instructions. A computer-readable medium may be any device or apparatus that can store, communicate, propagate, or transport a program for use by or in connection with the instruction execution system, apparatus, or device. For example, the computer-readable medium may be an electronic, magnetic, optical, electromagnetic, infrared, or semiconductor system, apparatus, device, or other propagation medium known in the art or yet to be developed. The computer-readable medium may even be paper or another suitable medium upon which the program is printed, as the program can be electronically captured, via for instance optical scanning of the paper or other medium, then compiled, interpreted or otherwise processed in an appropriate manner if necessary, and then stored in a computer memory.

The process descriptions or blocks in the flowcharts presented in FIGS. 1, 2, 5, and 6 may be understood to represent modules, segments, or portions of code or logic, which include one or more executable instructions for implementing specific logical functions or steps in the associated process. Alternative implementations are included within the scope of the present invention in which functions may be executed out of order from the order shown or described herein, including substantially concurrently or in reverse order, depending on the functionality involved, as would be understood by those reasonable skilled in the art after having become familiar with the teachings of the present invention.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for determining a similarity ratio that a selected media file of interest is a derivative work of or is derived from one or more predetermined media files comprising:
   providing a selected media file of interest and one or more predetermined media files to be compared with the selected media file of interest,
   obtaining media type classifications for the selected media file of interest and for each of the one or more predetermined media files,
   extracting data or metadata from the selected media file of interest and the one or more predetermined files, wherein at least two different categories of data or metadata are extracted from the selected media file of interest and the one or more predetermined media files by engaging at least two extraction engines,
   harvesting the data or metadata extracted from the selected media file of interest and the one or more predetermined media files,
   storing the data or metadata extracted from the selected media file of interest and the one or more predetermined media files,
   selecting, based on the media type classifications, two or more ranked categories of data or metadata to be used for generating media file identifiers for the selected media file of interest and for each of the one or more predetermined media files,
   generating, based on the selected two or more ranked categories of data or metadata, the media file identifiers for the selected media file of interest and for each of the one or more predetermined media files,
   storing the media file identifier generated for the selected media file of interest and the media file identifiers generated for each of the one or more predetermined media files,
   comparing the media file identifier generated for the selected media file of interest to the media file identifier generated for each of the one or more predetermined media files, and
   determining a similarity ratio that the selected media file of interest is a derivative work of or is derived from each of the one or more predetermined media files based on comparing the media file identifier generated for the selected media file of interest to the media file identifiers generated for each of the one or more predetermined media files, said similarity ratio indicative of whether the selected media file of interest is derived from one or more predetermined media files without regard to the media type classifications of selected media file of interest and the one or more predetermined media files.

2. The method of claim 1, comprising storing media file identifiers that have been generated for each of the one or more predetermined media files to form a library of media file identifiers and retrieving the stored media file identifiers that have been generated for each of the one or more predetermined media files from the library of media file identifiers to compare the media file identifier generated for the selected media file of interest to the media file identifier generated for each of the one or more predetermined media files.

3. The method of claim 1, comprising assigning a weight to the one or more harvested subsets of data or metadata, wherein the weight assigned to the one or more harvested subsets of data or metadata is based on the ranking of the categories for the data or metadata, and wherein the assigned weight is used to generate the media file identifiers for the selected media file of interest and for each of the one or more predetermined media files.

4. The method of claim 1, wherein the at least two data extraction engines are configured to use the same data extraction process to extract different categories of data or metadata from the selected media file of interest and from each of the one or more predetermined media files.

5. The method of claim 1, wherein the similarity ratios are determined as a percentage.

6. The method of claim 1, wherein at least one of the one or more predetermined media files is not the same type of media file as the selected media file of interest.

7. A system for determining a similarity ratio that a selected media file of interest is a derivative work of or is derived from one or more predetermined media files comprising:
   a data receiving and input device for receiving a selected media file of interest and one or more predetermined media files to be compared with the selected media file of interest;
   a data receiving and output device for providing similarity ratios quantifying how similar a selected media file of interest is to each of the one or more predetermined media files; and
   a data and metadata harvesting, extraction, analysis, evaluation, and storage system, the data and metadata harvesting, extraction, analysis, evaluation, and storage system further comprising:
      at least two data extraction engines configured to extract different categories of data or metadata from the selected media file of interest and from each of the one or more predetermined media files;
      a data and metadata harvesting engine configured to manage the at least two data extraction engines and to collect and harvest data or metadata extracted from the at least two data extraction engines, wherein the harvested data or metadata is stored in a data store as data or metadata subsets within each category of data or metadata extracted from the selected media file of interest and each of the one or more predetermined media files;

an analysis engine configured to:
obtain media type classifications for the selected media file of interest and for each of the one or more predetermined media files;
select, based on the media type classifications, at least one category of data or metadata to be used for generating media file identifiers for the selected media file of interest and for each of the one or more predetermined media files;
generate, based on the selected at least one category of data or metadata, the media file identifiers for the selected media file of interest and for each of the one or more predetermined media files;
compare the generated media file identifier for the selected media file of interest with each of the generated media file identifiers for each of the one or more predetermined media files; and
determine similarity ratios that a selected media file of interest is a derivative work of or is derived from one or more predetermined media files based on the comparison of the media file identifier for the selected media file of interest with each of the generated media file identifiers for each of the one or more predetermined media files, said similarity ratio indicative of whether the selected media file of interest is derived from one or more predetermined media files without regard to the media type classifications of selected media file of interest and the one or more predetermined media files; and a user interface configured to provide a user access to a set of features and functionality of the system and to enable the user to select and rank one or more harvested subsets of data or metadata.

8. The system of claim 7, comprising a data store configured to store:
the data and metadata extracted from the selected media file of interest and each of the one or more predetermined media files;
the media file identifiers generated for the selected media file of interest and each of the one or more predetermined media files; and
the similarity ratios determined for each comparison made between the media file identifier of the selected media file of interest and the media file identifiers of each of the one or more predetermined media files.

9. The system of claim 8, wherein the data store is configured to store media file identifiers that have been generated for each of the one or more predetermined media files to form a library of media file identifiers for a set of predetermined media files prior to receiving a selected media file of interest.

10. The system of claim 7, wherein the one or more harvested subsets of data or metadata are ranked according to their importance by the user, wherein each ranking is used to assign a weight to the one or more harvested subsets of data or metadata, and wherein the weight assigned to the one or more harvested subsets of data or metadata is used in generating media file identifiers for the selected media file of interest and for each of the one or more predetermined media files.

11. The system of claim 7, wherein the at least two data extraction engines are configured to use the same data extraction process to extract different categories of data or metadata from the selected media file of interest and from each of the one or more predetermined media files.

12. The system of claim 7, wherein the selected media file of interest has been selected by an automated selection system.

13. The system of claim 7, wherein the data and metadata harvesting engine comprises an extraction engine manager configured to engage a first extraction engine and one or more other extraction engines in parallel.

14. The system of claim 7, wherein the data and metadata harvesting engine comprises an extraction engine manager configured to engage a first extraction engine and one or more other extraction engines in sequence.

15. The system of claim 7, wherein the similarity ratios are determined as a percentage.

16. The system of claim 7, wherein at least one of the one or more predetermined media files is not the same type of media file as the selected media file of interest.

17. Non-transitory computer-readable storage media encoded with a computer program including instructions executable by a processor for determining a similarity ratio that a selected media file of interest is a derivative work or is derived from one or more predetermined media files, the media comprising:
a database, recorded on the media, comprising different types of data and metadata extracted from each of the selected media file of interest and the one or more predetermined media files;
an evaluation software module comprising instructions for:
obtaining media type classifications for the selected media file of interest and for each of the one or more predetermined media files,
extracting data or metadata from the selected media file of interest and the one or more predetermined files, wherein at least two different categories of data or metadata are extracted from the selected media file of interest and the one or more predetermined media files by engaging at least two extraction engines,
harvesting the data or metadata extracted from the selected media file of interest and the one or more predetermined media files,
storing the data or metadata extracted from the selected media file of interest and the one or more predetermined media files,
selecting, based on the media type classifications, two or more ranked categories of data or metadata to be used for generating media file identifiers for the selected media file of interest and for each of the one or more predetermined media files,
generating, based on the selected two or more ranked categories of data or metadata, the media file identifiers for the selected media file of interest and for each of the one or more predetermined media files,
storing the media file identifiers generated for the selected media file of interest and for each of the one or more predetermined media files,
comparing the media file identifier generated for the selected media file of interest to each of the media file identifier generated for each of the one or more predetermined media files, and
determining a similarity ratio that the selected media file of interest is a derivative work of or is derived from each of the one or more predetermined media files based on comparing the media file identifier generated for the selected media file of interest to each of the media file identifiers generated for each of the one or more predetermined media files, said similarity ratio indicative of whether the selected media file of interest is derived from one or more predetermined media files without regard to the media type classifications of selected media file of interest and the one or more predetermined media files.

18. The media of claim 17, wherein the evaluation software module comprises instructions for:
storing the data or metadata extracted from the selected media file of interest and the one or more predetermined media files in the database;
storing the media file identifiers generated for the selected media file of interest and for each of the one or more predetermined media files in the database; and
storing the similarity ratio in the database.

19. The media of claim 17, wherein the one or more harvested subsets of data or metadata are ranked according to their importance, wherein each ranking is used to assign a weight to the one or more harvested subsets of data or metadata, and wherein the weight assigned to the one or more harvested subsets of data or metadata is used in generating media file identifiers for the selected media file of interest and for each of the one or more predetermined media files.

20. The media of claim 17, wherein at least one of the one or more predetermined media files is not the same type of media file as the selected media file of interest.

\* \* \* \* \*